US011557052B2

United States Patent
Choi

(10) Patent No.: US 11,557,052 B2
(45) Date of Patent: Jan. 17, 2023

(54) VANISHING POINT EXTRACTION DEVICES AND METHODS OF EXTRACTING VANISHING POINT

(71) Applicant: Samsung Electronics Co., Ltd., Suwon-si (KR)

(72) Inventor: Jinhyuk Choi, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 79 days.

(21) Appl. No.: 17/173,803

(22) Filed: Feb. 11, 2021

(65) Prior Publication Data

US 2021/0256720 A1    Aug. 19, 2021

(30) Foreign Application Priority Data

Feb. 14, 2020 (KR) .................... 10-2020-0018571

(51) Int. Cl.
*G06K 9/00* (2022.01)
*G06T 7/536* (2017.01)
*G06V 20/56* (2022.01)

(52) U.S. Cl.
CPC ............ *G06T 7/536* (2017.01); *G06V 20/588* (2022.01); *G06T 2207/30256* (2013.01)

(58) Field of Classification Search
CPC ........... G06T 7/536; G06T 2207/30256; G06T 5/001; G06T 7/11; G06T 7/33; G06V 20/588; G06V 10/44
See application file for complete search history.

(56) References Cited

U.S. PATENT DOCUMENTS

| 7,864,981 | B2  | 1/2011 | Leleve et al. |
| 10,127,662 | B1  | 11/2018 | Reicher et al. |
| 10,235,579 | B2  | 3/2019 | Park et al. |
| 2010/0097455 | A1* | 4/2010 | Zhang .................. G06V 20/588 |
| | | | 701/25 |
| 2010/0104137 | A1* | 4/2010 | Zhang ................... G06V 20/58 |
| | | | 382/104 |

(Continued)

FOREIGN PATENT DOCUMENTS

| JP | 3293441 B2 | 6/2002 |
| JP | 2011-053731 A | 3/2011 |

(Continued)

*Primary Examiner* — Shervin K Nakhjavan
(74) *Attorney, Agent, or Firm* — Harness, Dickey & Pierce, P.L.C.

(57) ABSTRACT

Vanishing point extraction includes obtaining a straight line including a vanishing point of a first image; obtaining a plurality of sample points in the first image based on processing the first image according to an object included in the first image and the straight line including the vanishing point of a first image, such that the plurality of sample points are determined as pixels in the first image having coordinates that overlap with coordinates of pixels of both the straight line and the object included in the first image; obtaining at least one matching point, in a second image, that corresponds to at least one sample point of the plurality of sample points in the first image the second image generated subsequently to the first image being generated; and obtaining a vanishing point of the second image based on the at least one matching point of the second image.

20 Claims, 20 Drawing Sheets

(56) References Cited

U.S. PATENT DOCUMENTS

2013/0265424 A1* 10/2013 Zhang ................ G06V 10/809
                                                        348/148
2019/0034740 A1*  1/2019 Kwant ................ G06K 9/6274
2019/0279004 A1*  9/2019 Kwon ................. G06V 10/273
2020/0082179 A1*  3/2020 Sugie ................... G06V 20/56

FOREIGN PATENT DOCUMENTS

| JP | 4935504 B2 | 5/2012 |
| JP | 5695405 B2 | 4/2015 |
| JP | 2017-054424 A | 3/2017 |
| KR | 10-1569165 B1 | 11/2015 |

* cited by examiner

VANISHING POINT EXTRACTION DEVICES AND METHODS OF EXTRACTING VANISHING POINT

CROSS-REFERENCE TO RELATED APPLICATION

This application claims the benefit, under 35 U.S.C. § 119, of Korean Patent Application No. 10-2020-0018571, filed on Feb. 14, 2020, in the Korean Intellectual Property Office, the disclosure of which is incorporated herein in its entirety by reference.

BACKGROUND

The present disclosure relates to vanishing point extraction devices and vanishing point extraction methods, and more particularly, to vanishing point extraction devices and vanishing point extraction methods for extracting a vanishing point of a current image based on information on a vanishing point of a previous image and an object included in the previous image.

An image capturing device using an image sensor may be included in various types of electronic devices such as smart phones, PCs, surveillance cameras, and automobiles, or may be used as a single independent electronic device.

In the case of an autonomous vehicle, safe driving may be performed by obtaining an image of the surroundings of the autonomous vehicle through an image sensor, determining a surrounding situation using the obtained image, and controlling the autonomous vehicle according to a determination result. For example, an autonomous vehicle may extract a vanishing point from an image through a vanishing point extraction device, estimate a distance between vehicles using the extracted vanishing point, or detect the shaking of the vehicle.

In the case of a vanishing point extraction device according to a conventional method, lanes in an image are detected, and the detected lanes are extended in a straight line to check intersections that cross each other as vanishing points.

SUMMARY

The present disclosure provides a vanishing point extraction device and a vanishing point extraction method capable of extracting a vanishing point of a current image even if no lane is detected in the current image by extracting the vanishing point of the current image based on the vanishing point of a previous image and information on the objects included in the previous image. Accordingly, the vanishing point extraction device according to some example embodiments, enables vanishing points to be extracted even if there is no lane around and/or if the detection of a lane in the image fails even if there is a lane.

According to some example embodiments, a method for performing vanishing point extraction may include obtaining a straight line including a vanishing point of a first image, based on processing the first image, obtaining a plurality of sample points in the first image based on processing the first image according to an object included in the first image and the straight line including the vanishing point of the first image, such that the plurality of sample points are determined as pixels in the first image having coordinates that overlap with coordinates of pixels of both the straight line and the object included in the first image, obtaining at least one matching point, in a second image, that corresponds to at least one sample point of the plurality of sample points in the first image the second image generated subsequently to the first image being generated; and obtaining a vanishing point of the second image based on the at least one matching point of the second image.

The obtaining of the at least one matching point may include obtaining a plurality of first templates each corresponding to a separate sample point of the plurality of sample points of the first image; obtaining at least one second template in the second image, where the at least one second template is determined to be similar to at least one first template of the plurality of first templates; and obtaining the at least one matching point as a pixel in the second image that is associated with the at least one second template.

The obtaining of the plurality of first templates may include obtaining areas of a particular size as the plurality of first templates, wherein the areas include separate, respective sample points of the plurality of sample points.

The obtaining of the at least one second template may include obtaining a plurality of search areas of the second image, the plurality of search areas corresponding to separate, respective sample points of the plurality of sample points of the first image; and obtaining, for each sample point, a candidate area, in a search area corresponding to the sample point, that is similar to a first template corresponding to the sample point as a separate second template of the at least one second template.

The obtaining of the plurality of search areas may include identifying points in the second image that have same coordinates in the second image as coordinates of separate, respective points of the plurality of sample points in the first image; and obtaining areas in the second image that have a particular size and include separate, respective points of the identified points as the plurality of search areas.

The plurality of search areas may have sizes that are larger than sizes of the plurality of first templates.

The obtaining of the candidate area that is similar to the first template corresponding to the sample point as the separate second template may include determining a plurality of candidate areas in the search area corresponding to the sample point; calculating a correlation value between each candidate area of the plurality of candidate areas and a first template, of the plurality of first templates, that corresponds to the sample point to establish a plurality of correlation values that correspond to separate, respective candidate areas; and obtaining a candidate area corresponding to a highest correlation value of the plurality of correlation values as the separate second template.

The obtaining of the at least one matching point from the at least one second template may include identifying a center point of the at least one second template as the at least one matching point.

The straight line including the vanishing point of the first image may be a horizontal line parallel to a horizontal axis of the first image.

The object included in the first image may be a vehicle or a particular object associated with the vehicle.

The method may further include removing an outlier of the at least one matching point, wherein the obtaining of the vanishing point of the second image further comprises obtaining a vanishing point of the second image based on at least one matching point from which the outlier is removed.

The removing of the outlier of the at least one matching point may include removing an outlier using at least one of a RANdom SAmple Consensus (RANSAC) model, a PROgressive SAmple Consensus (PROSAC) model, or a Stable random sample consensus (StaRSaC) model.

The obtaining of the vanishing point of the second image may include correcting the vanishing point of the first image based on the at least one matching point to obtain a vanishing point of the second image.

The obtaining of the vanishing point of the second image may include obtaining a vanishing point of the second image based on correcting a y-coordinate of the vanishing point of the first image using y-coordinates of the at least one matching point.

According to some example embodiments, a vanishing point extraction device may include an image sensor, the image sensor configured to generate a first image and to generate a second image subsequently to generating the first image. The vanishing point extraction device may include a memory configured to store the first image, information associated with a vanishing point of the first image, and information associated with at least one object included in the first image. The vanishing point extraction device may include processing circuitry configured to, in response to receiving the second image from the image sensor, identify a horizontal line in the first image that includes the vanishing point of the first image based on the information associated with the vanishing point of the first image, obtain a plurality of sample points in the first image based on processing the first image using the information associated with the at least one object included in the first image, such that the plurality of sample points are determined as pixels in the first image having coordinates that overlap with coordinates of pixels of both the at least one object and the horizontal line, identify at least one matching point in the second image that corresponds to at least one sample point of the plurality of sample points in the first image, and obtain a vanishing point of the second image based on correcting the vanishing point of the first image using the at least one matching point.

The processing circuitry may be further configured to obtain a plurality of first templates of the first image, the plurality of first templates corresponding to separate, respective sample points of the plurality of sample points in the first image, and obtain at least one second template of the second image, the at least one second template being similar to at least one first template of the plurality of first templates.

The processing circuitry may be further configured to obtain areas of a particular size as the plurality of first templates, wherein each separate area includes a separate sample point of the plurality of sample points.

The processing circuitry may be further configured to obtain a plurality of search areas of the second image, the plurality of search areas corresponding to separate, respective sample points of the plurality of sample points of the first image, and obtain, for each sample point, a candidate area, in the search area corresponding to the sample point, that is similar to the first template corresponding to the sample point as a separate second template of the at least one second template.

The processing circuitry may be further configured to identify points in the second image that have same coordinates in the second image as coordinates of separate, respective points of the plurality of sample points in the first image, and obtain areas in the second image that have a particular size and include separate, respective points of the identified points as the plurality of search areas.

The processing circuitry may be configured to determine a plurality of candidate areas in the search area corresponding to the sample point, calculate a correlation value between each candidate area of the plurality of candidate areas and a first template, of the plurality of first templates, that corresponds to the sample point to establish a plurality of correlation values that correspond to separate, respective candidate areas, and obtain a candidate area corresponding to a highest correlation value of the plurality of correlation values as the separate second template.

The processing circuitry may be further configured to identify a central point of the at least one second template as the at least one matching point.

The processing circuitry may be further configured to remove an outlier of the at least one matching point and obtain a vanishing point of the second image based on at least one matching point from which the outlier is removed.

The processing circuitry may be further configured to remove an outlier using at least one of a RANdom SAmple Consensus (RANSAC) model, a PROgressive SAmple Consensus (PROSAC) model, or a Stable random sample consensus (StaRSaC) model.

The processing circuitry may be further configured to obtain a vanishing point of the second image based on correcting a y-coordinate of the vanishing point of the first image using y-coordinates of the at least one matching point.

According to some example embodiments, an autonomous driving device configured to be included in a host vehicle may include: an image sensor, the image sensor configured to generate a first image and to generate a second image subsequently to generating the first image. The autonomous driving device may include a memory configured to store the first image, information associated with a vanishing point of the first image, and information associated with at least one object included in the first image. The autonomous driving device may include a first processing circuitry configured to, in response to receiving the second image from the image sensor, identify a horizontal line in the first image that includes the vanishing point of the first image based on the information associated with the vanishing point of the first image, obtain a plurality of sample points in the first image based on processing the first image using the information associated with the at least one object included in the first image, such that the plurality of sample points are determined as pixels in the first image having coordinates that overlap with coordinates of pixels of both the at least one object and the horizontal line, identify at least one matching point in the second image that corresponds to at least one sample point of the plurality of sample points in the first image, and obtain a vanishing point of the second image based on correcting the vanishing point of the first image using the at least one matching point. The autonomous driving device may include a second processing circuitry configured to control an operation of the host vehicle based on the information associated with the vanishing point of the second image obtained through the first processing circuitry.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
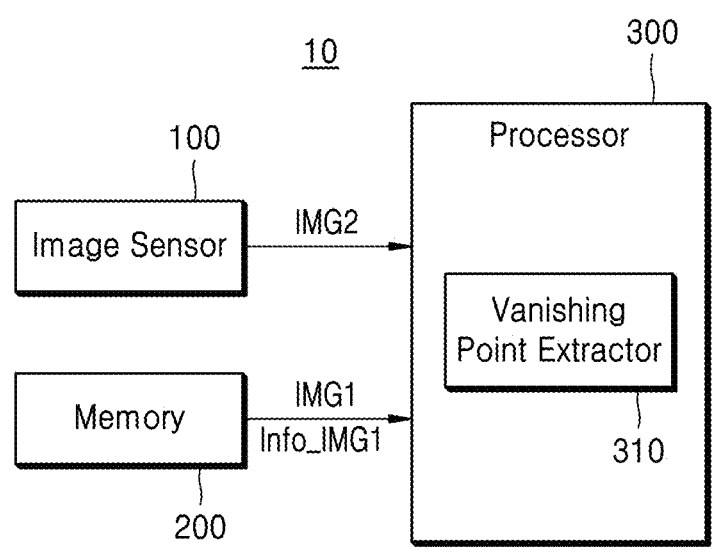
FIG. 1 is a block diagram showing a vanishing point extraction device according to some example embodiments of the present disclosure.

FIG. 1 is a block diagram showing a vanishing point extraction device according to some example embodiments of the present disclosure.

Referring to FIG. 1, a vanishing point extraction device 10 may include an image sensor 100, a memory 200 and a processor 300. Also, the processor 300 may include a vanishing point extractor 310.

The vanishing point extraction device 10 is a device that captures an image, analyzes the captured image, and extracts the vanishing point of the image based on the analysis result. The vanishing point extraction device 10 may be implemented as a personal computer (PC), an Internet of Things (IoT) device, or a portable electronic device. Portable electronic devices may be provided in various devices such as laptop computers, mobile phones, smartphones, tablet PCs, personal digital assistants (PDAs), enterprise digital assistants (EDAs), digital still cameras, digital video cameras, audio devices, portable multimedia players (PMPs), personal navigation devices (PNDs), MP3 players, handheld game consoles, e-books, and wearable devices.

The image sensor 100 is embedded in the vanishing point extraction device 10 and is configured to receive (e.g., generate, capture, etc.) an image signal for (e.g., of) the surrounding environment of the vanishing point extraction device 10 and output (e.g., transmit) the received image signal as an image. Such an image may be understood to be generated, captured, etc. by the image sensor 100. For example, the image sensor 100 may generate an image by (e.g., based on) converting light received at the image sensor 100 from an external environment in front or in various directions into electrical energy (e.g., an electrical signal) and output the electrical signal as a generated image of the external environment to the processor 300.

The memory 200 (e.g., a solid state drive (SSD)) is a storage location (e.g., non-transitory computer readable storage medium) for storing data and may store data generated through the image sensor 100 (e.g., images generated by the image sensor 100) and various data generated in a process performed by the processor 300. For example, the memory 200 may store an image obtained through (e.g., generated by and/or received from) the image sensor 100. In addition, the memory 200 may store information on (e.g., associated with) the vanishing point of the image, information on (e.g., associated with) an object included in the image, and the like, as described later in relation to the operation of the processor 300.

The processor 300 may control overall operation of the vanishing point extraction device 10. The processor 300 may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (SSD), storing a program of instructions, and a processor configured to execute the program of instructions to implement the functionality and/or methods performed by some or all of the vanishing point extraction device 10, including the functionality and/or methods performed by some or all of the processor 300 (e.g., the functionality and/or methods performed by the vanishing point extractor 310).

The processor 300 may extract the vanishing point through the vanishing point extractor 310, for example based on processing an image. For example, the processor 300 may receive and/or obtain an image from the image sensor 100 (e.g., an image generated by the image sensor 100) and, in response to such receipt and/or based on processing the image, extract a vanishing point of the image received through the vanishing point extractor 310 (e.g., based on implementing the functionality of the vanishing point extractor 310 to process the image). The vanishing point extractor 310 may be implemented in firmware or software and may be loaded into the memory 200 and executed by the processor 300. However, the present disclosure is not limited to this, and the vanishing point extractor 310 may be implemented in hardware. An obtained or identified element "of" an image and an obtained or identified element "in" an image may be used herein interchangeably.

When the current image (also referred to herein as a second image IMG2) is received from the image sensor 100 (e.g., in response to such receipt), the vanishing point extractor 310 may extract the vanishing point of the current image using the previous image (also referred to herein as a first image IMG1), which may be an image previously generated by the image sensor 100. Here, the previous image may include an image received from the image sensor 100 before receiving the current image. Restated, the image sensor 100 may generate the current image (e.g., second image IMG2) subsequently to generating the previous image (e.g., first image IMG1). In some example embodiments, the current image (e.g., second image IMG2) may be a next image generated by the image sensor 100 after the previous image (e.g., first image IMG1) was generated by the image sensor 100, such that no intervening images are generated by the image sensor 100 between the generation of the previous image and the generation of the current image. In some example embodiments, one or more intervening images may be generated by the image sensor 100 between generating the previous and current images. Hereinafter, for convenience of description, the current image is referred to as a second image IMG2 and the previous image is referred to as a first image IMG1.

In some example embodiments, when receiving the second image IMG2 from the image sensor 100 (e.g., in response to said receipt), in order to extract the vanishing point of the received image IMG2, the vanishing point extractor 310 may receive (e.g., access, obtain, etc.) the first image IMG1 and information Info_IMG1 on (e.g., associated with) the first image IMG1 from the memory 200.

Here, the information Info_IMG1 on the first image IMG1 may include information on (e.g., associated with) a vanishing point extracted from the first image IMG1 (e.g., previously extracted by the vanishing point extractor 310) and information on (e.g., associated with) an object included in the first image IMG1. For example, the information on the vanishing point extracted from the first image IMG1 may include coordinates of the vanishing point of the first image IMG1 (e.g., coordinates of the vanishing point within the first image IMG1), and the information on the object included in the first image IMG1 may include coordinates e.g., coordinates within the first image IMG1) for an area of the object recognized as a result of performing object recognition on the first image IMG1 (e.g., a region of the first image IMG1 at which the object is located within the first image IMG1).

Then, the vanishing point extractor 310 obtains (e.g., identifies) a straight line including the vanishing point from the first image IMG1 by (e.g., based on) using the first image IMG1 and information on the vanishing point of the first image IMG1 (e.g., based on processing the first image IMG1 based on the information on the vanishing point of the first image IMG1), and the vanishing point extractor 310 may, based on obtaining the straight line, obtain (e.g., identify) a plurality of sample points that each intersect with both the straight line and the area of the object at the same time from the first image IMG1 by (e.g., based on) using information on the object included in the first image IMG1 (e.g., based on processing the first image IMG1 based on the information on the object included in the first image IMG1, information associated with the obtained straight line, and/or the information on the vanishing point of the first image IMG1).

In addition, the vanishing point extractor 310 may obtain (e.g., identify) at least one matching point corresponding to at least one sample point of a plurality of sample points of the first image IMG1 from the second image IMG2 by (e.g., based on) comparing the first image IMG1 to the second image IMG2 (e.g., based on identifying an area of the second image IMG2 that is similar to a first template of the first image IMG1 and determining a pixel that is a center point of said area as a matching point). In addition, the vanishing point extractor 310 may extract the vanishing point of the second image IMG2 based on the obtained at least one matching point. Detailed description thereof will be described later with reference to FIG. 2.

The vanishing point extraction device 10 according to the inventive concepts of the present disclosure may extract the vanishing point of the current image using information on the vanishing point of the previous image and the object recognized in the previous image. That is, the vanishing point extraction device 10 according to the inventive concepts of the present disclosure may extract the vanishing point of the current image even if there is no lane in the current image (e.g., a lane of a road in an environment imaged in the current image and/or lane markings indicating one or more boundaries of the lane) or when there is a lane in the current image but the lane is not detected. Accordingly, the performance of a device implementing an application and/or service to operate based on imaging the exterior environment (e.g., a vehicle implementing an advanced driver-assistance system (ADAS)) may be improved (e.g., the vehicle may have improved performance to provide at least partially autonomous driving and/or providing driving assistance to a driver of the vehicle).

For example, the vanishing point extraction device 10 may be included in a vehicle implementing the ADAS, and the vehicle may include a vehicle controller that controls autonomous driving. The vehicle controller may calculate a distance between the vehicle and a surrounding vehicle based on the vanishing point information, and/or detect area of a road the vehicle is driving. The vehicle controller may control a driving direction and a driving speed of the vehicle based on the calculated distance and/or the detected road area. The vanishing point extraction device 10 may extract a vanishing point from an image captured in real time even when the vehicle is driving on a road with no lane or an unclear lane, and may provide vanishing point information including the extracted vanishing point to the vehicle controller. Accordingly, since the vehicle controller can use the vanishing point information provided in real time, the vehicle controller can control the vehicle using a driving direction and a driving speed suitable for a driving situation that changes in real time. In other words, the vehicle controller may provide an autonomous driving function with high accuracy based on the vanishing point information provided from the vanishing point extraction device 10.

In some example embodiments, in FIG. 1, although the vanishing point extraction device 10 is illustrated and described as including the image sensor 100, according to some example embodiments, the vanishing point extraction device 10 and the image sensor 100 may be implemented in separate components, and the vanishing point extraction device 10 may be implemented through a method of receiving an image from an external image sensor 100 and extracting the vanishing point of the received image. In addition, according to some example embodiments, the vanishing point extraction device 10 does not include an image sensor 100, and may be implemented through a method of receiving an image through a communication device (not shown) and extracting the vanishing point of the received image.

In addition, in FIG. 1, although the vanishing point extraction device 10 is illustrated and described as including the memory 200, according to some example embodiments, the vanishing point extraction device 10 and the memory 200 may be implemented in separate components, and the vanishing point extraction device 10 may be also implemented by receiving the previous image and information on the previous image from the external memory 200 and extracting the vanishing point of the current image using the received image and information on the image.

In addition, in FIG. 1, although the vanishing point extraction device 10 is illustrated and described as including one memory 200, the vanishing point extraction device 10 may include a plurality of memories 200. In addition, according to some example embodiments, the vanishing point extraction device 10 may store an image captured by the image sensor 100 in one of the plurality of memories, and store information on an image such as a vanishing point, a recognized object, and the like in other memory of the plurality of memories.

Figure 2:
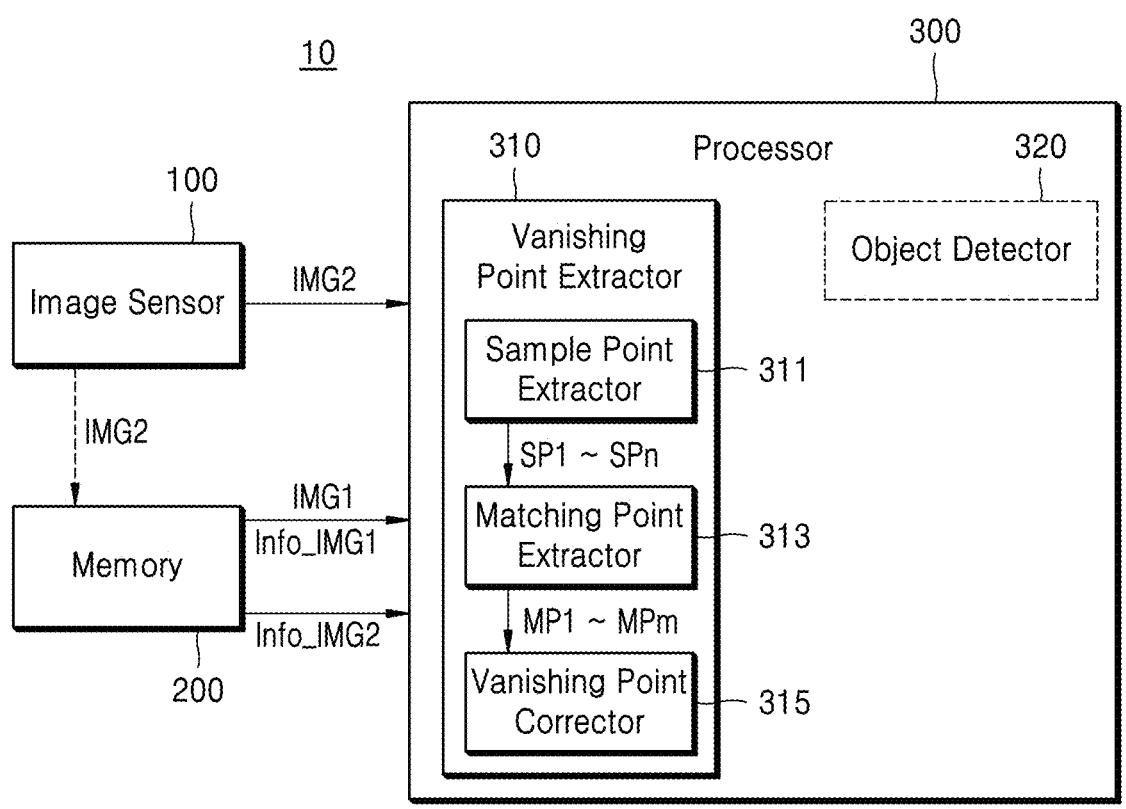
FIG. 2 is a diagram showing in detail a vanishing point extraction device according to some example embodiments of the present disclosure.

FIG. 2 is a diagram showing in detail a vanishing point extraction device according to some example embodiments of the present disclosure. Specifically, FIG. 2 is a diagram showing in detail the vanishing point extraction device 10 of FIG. 1.

Referring to FIGS. 1 and 2, the vanishing point extraction device 10 may include an image sensor 100, a memory 200, and a processor 300. In some example embodiments, the processor 300 may include and/or may implement a vanishing point extractor 310 and an object detector 320, and the vanishing point extractor 310 may include a sample point extractor 311, a matching point extractor 313, and a vanishing point corrector 315. It will be understood that the vanishing point extractor 310 and an object detector 320, including the sample point extractor 311, the matching point extractor 313, and/or the vanishing point corrector 315, and/or the functionality thereof, may be implemented by one or more instances of processing circuitry included in and/or implementing some or all of the processor 300, such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like.

When the second image IMG2 is received from the image sensor 100 (e.g., in response to such receipt), the vanishing point extractor 310 may receive (e.g., access, obtain, etc.) the first image IMG1 and information on the first image IMG1 from the memory 200. In addition, the vanishing point extractor 310 may obtain (e.g., identify) a plurality of sample points SP1 to SPn ("n" being a positive integer) from the first image IMG1 through the sample point extractor 311. As described herein, obtaining an element may be referred to interchangeably as identifying the element.

Specifically, the sample point extractor 311 may obtain (e.g., identify) a straight line including the vanishing point of the first image IMG1 from the first image IMG1 using the information Info_IMG1 on the first image IMG1 (e.g., based on processing the first image IMG1 based on the information Info_IMG1 on the first image IMG1). In some example embodiments, the sample point extractor 311 may obtain coordinates of pixels of the first image IMG1, said pixels constituting a straight line including the vanishing point of the first image IMG1 using the coordinates of the vanishing point of the first image IMG1. Here, the straight line including the vanishing point of the first image IMG1 may include a vanishing point of the first image IMG1 (e.g., may intersect with and/or overlap with the vanishing point, as shown in at least FIG. 5) and may be a horizontal line parallel to the horizontal axis of the first image IMG1. Moreover, the present disclosure is not limited to this, and the straight line including the vanishing point of the first image IMG1 includes the vanishing point of the first image IMG1 and may be a vertical line parallel to the vertical axis or a diagonal line.

In addition, the sample point extractor 311 may obtain a plurality of sample points SP1 to SPn (e.g., points within the first image IMG1) that intersect with the object included in the straight line and the first image IMG1 simultaneously from the first image IMG1 using the information Info_IMG1 on the first image IMG1 (e.g., based on processing the first image IMG1). Also, the sample point extractor 311 may transmit the obtained plurality of sample points SP1 to SPn to the matching point extractor 313. In some example embodiments, the sample point extractor 311 may identify pixels overlapping coordinates of pixels constituting the straight line among coordinates of an area of an object included in the first image IMG1, and obtain the identified pixels as a plurality of sample points SP1 to SPn.

In addition, the vanishing point extractor 310 may obtain at least one matching point corresponding to a plurality of sample points from the second image IMG2 through the matching point extractor 313. The specific operation for this is as follows.

First, the matching point extractor 313 may obtain a plurality of first templates respectively corresponding to the plurality of sample points SP1 to SPn from the first image IMG1. In some example embodiments, the matching point extractor 313 may acquire an area having coordinates of each sample point for each of the plurality of sample points SP1 to SPn, and a particular (or, alternatively, predetermined) size as a first template. The preset sizes of the plurality of first templates may be set according to the manufacturer or the user. Moreover, the sizes of the plurality of first templates may be the same and may have different sizes according to embodiments.

Then, the matching point extractor 313 may compare the plurality of first templates of the first image IMG1 and the second image IMG2, identify an area similar to at least one of the plurality of first templates in (e.g., of) the second image IMG2, and obtain at least one area identified above from the second image IMG2 as a second template. Also, the matching point extractor 313 may extract at least one of matching points MP1 to MPm ("m" being a positive integer which may be the same as or different from "n") from at least one second template. In some example embodiments, the matching point extractor 313 may obtain a central point (e.g., center point) of each of the second templates as a matching point. In addition, the matching point extractor 313 may transmit the obtained at least one of the matching points MP1 to MPm to the vanishing point corrector 315.

It will be understood that areas, templates, or the like that are determined to be "similar" may refer to separate areas of one or more images that have a determined correlation that is greater than a correlation value threshold. Such a correlation value threshold may be, for example, equal to or greater than 90%, such that an area in the second image IMG2 may be determined to be "similar" to a corresponding first template of the first image IMG1 in response to a determination that a difference between the area and the first template is equal to or less than 10% and/or that pixels of the area at least a 90% match, in patterns and/or value, to the pixels of the first template (i.e., a match between the area and the first template with at least 90% confidence). It will be understood that elements (e.g., images, limited portions or areas thereof, or the like) may be determined to be "similar" where the elements are determined to match within a particular (or, alternatively, predetermined) deviation margin, which may be for example a margin of 10%.

In addition, the vanishing point extractor 310 may obtain a vanishing point of the second image IMG2 using at least one matching point MP1 to MPm through the vanishing point corrector 315.

Specifically, the vanishing point corrector 315 may obtain a vanishing point of the second image IMG2 by correcting the vanishing point of the first image IMG1 using at least one of the matching points MP1 to MPm. In some example embodiments, vanishing point corrector 315 may calculate the average of the coordinates of at least one of the matching points MP1 to MPm and obtain a vanishing point of the second image IMG2 by correcting the y-coordinate of the vanishing point of the first image IMG1 using the calculated y-coordinate of the average coordinate. In addition, the vanishing point extractor 310 may store information on the vanishing point of the second image IMG2 in the memory 200 as information on the second image IMG2 Info_IMG2.

The object detector 320 may perform object recognition on the second image IMG2 received from the image sensor 100. In addition, the object detector 320 may store information on the recognized object in the memory 200 as information on the second image IMG2 as a result of performing object recognition. The object detector 320 may be implemented in firmware or software and may be loaded into the memory 200 and executed by the processor 300. However, the present inventive concepts are not limited thereto, and the object detector 320 may be implemented in hardware.

When receiving the second image IMG2 from the image sensor 100, the processor 300 may extract the vanishing point of the second image IMG2 through the vanishing point extractor 310 and perform object recognition of the second image IMG2 through the object detector 320. According to some example embodiments, the processor 300 may perform a vanishing point extraction operation and an object recognition operation on the second image IMG2 in parallel or sequentially.

Moreover, in FIG. 2, although the object detector 320 is illustrated and described as being included in the processor 300, according to some example embodiments, the object detector 320 may be implemented in a separate processor (not shown) of the vanishing point extraction device 10, or the object detector 320 may be implemented outside the vanishing point extraction device 10. In this case, the processor 300 may perform only the vanishing point extraction operation and store only the information on the vanishing point of the second image IMG2 in the memory 200.

Figure 3:
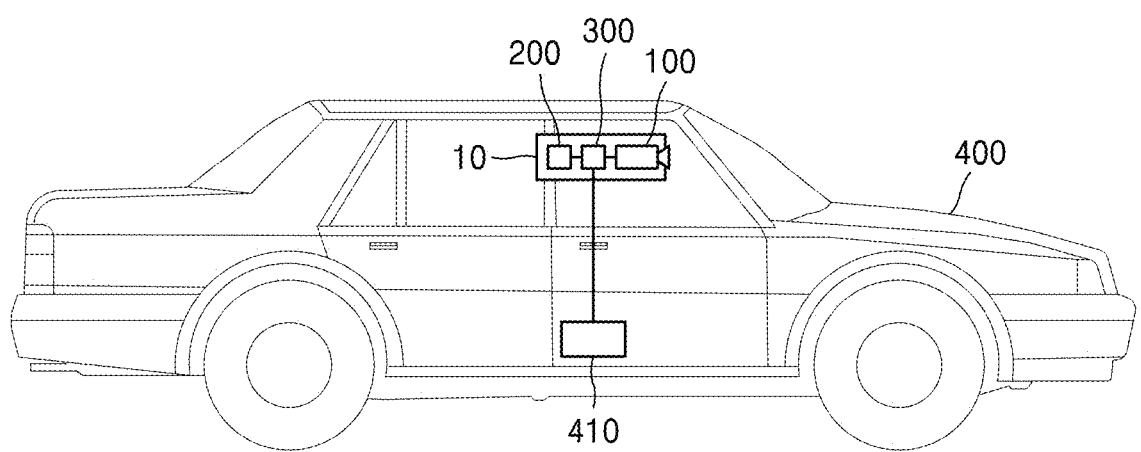
FIG. 3 is a diagram showing a host vehicle including a vanishing point extraction device according to some example embodiments of the present disclosure.

FIG. 3 is a diagram showing a host vehicle including a vanishing point extraction device according to some example embodiments of the present disclosure. Specifically, FIG. 3 is a diagram showing a host vehicle 400 including the vanishing point extraction device 10 of FIG. 1 and/or FIG. 2.

Referring to FIGS. 1 to 3, the host vehicle 400 may include a vanishing point extraction device 10 and a vehicle controller 410. The vanishing point extraction device 10 may be disposed on the upper end of the host vehicle 400, and the image sensor 100 may photograph the front of the host vehicle 400. Moreover, the placement position of the vanishing point extraction device 10 is not limited to the example embodiments shown in FIG. 3 and may be arranged at various positions of the host vehicle 400 according to the example embodiments shown in FIG. 3.

It will be understood that the vehicle controller 410, also referred to as vehicle control circuitry, may include, may be included in, and/or may be implemented by one or more instances of processing circuitry, such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (SSD), storing a program of instructions, and a processor configured to execute the program of instructions to implement the functionality and/or methods performed by some or all of the vehicle controller 410. The vehicle controller 410 and the vanishing point extraction device 10 may be implemented by same processing circuitries and/or different processing circuitries.

The vehicle controller 410 may control the overall driving of the host vehicle 400. The vehicle controller 410 may determine the surrounding situation of the host vehicle 400 and control the driving direction or driving speed of the host vehicle 400 based on the determination result. In some example embodiments, the vanishing point extraction device 10 may extract the vanishing point of the image taken in front of the host vehicle 400 obtained through the image sensor 100 and provide information on the extracted vanishing point to the vehicle controller 410. The vehicle controller 410 may calculate a distance between the host vehicle 400 and the surrounding vehicle based on information on the vanishing point received from the vanishing point extraction device 10, or control the driving direction or driving speed of the host vehicle 400. Accordingly, the vehicle controller 410 may generate output signals and/or control one or more devices of the host vehicle 400 to cause the host vehicle 400 to be driven and/or navigated along one or more trajectories, courses, or the like through a surrounding environment. Hereinafter, for convenience of explanation, under the assumption that the vanishing point extraction device 10 is disposed in the host vehicle 400, the specific operation of the vanishing point extraction method will be described with reference to FIGS. 4 to 18.

Figure 4:
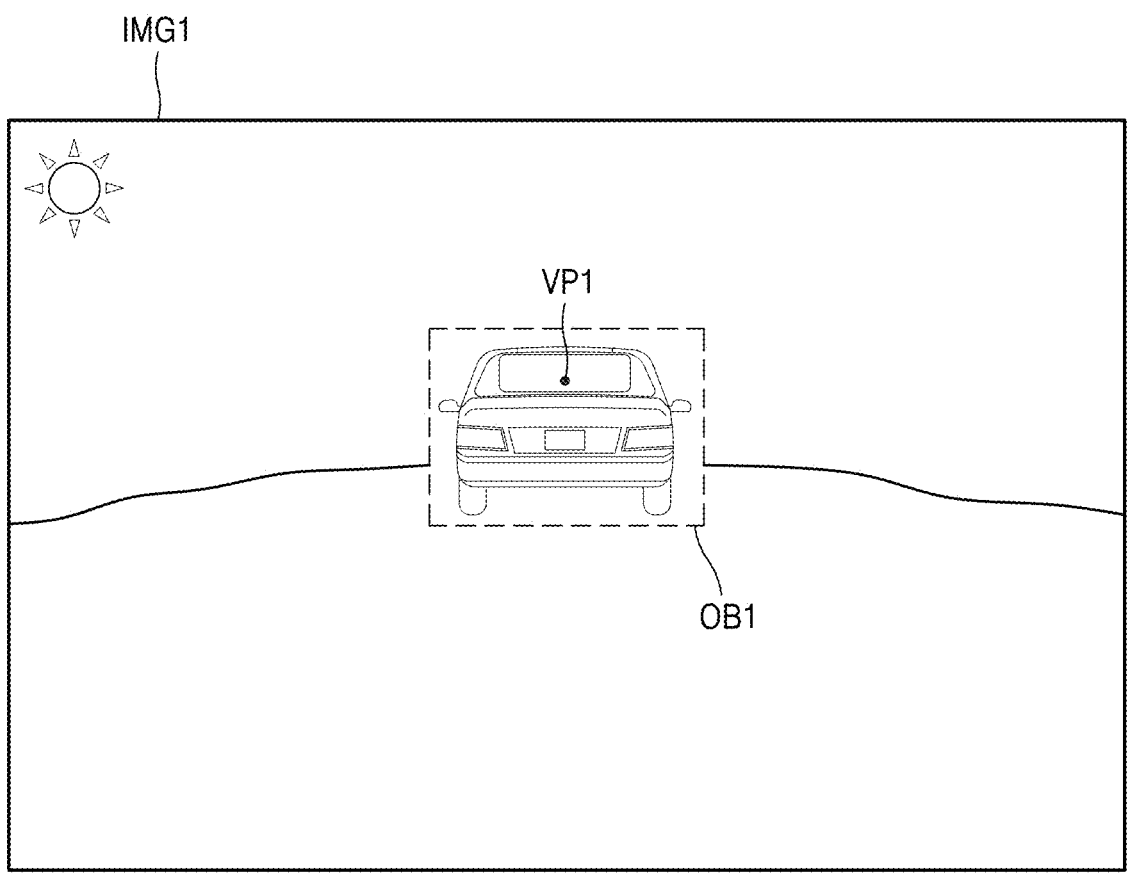
FIG. 4 is a diagram showing a first image according to some example embodiments of the present disclosure.

FIG. 4 is a diagram showing a first image according to some example embodiments of the present disclosure.

Referring to FIG. 4, an example of the first image IMG1 may be confirmed. The first image IMG1 is an image obtained (e.g., generated by the image sensor 100) by photographing the front of the host vehicle 400 (see FIG. 3) and/or generating an image of at least a portion of the surrounding environment that is proximate to a front of the host vehicle 400 (e.g., in front of the host vehicle 400) and may include an object OB1 recognized as a vehicle. Moreover, the object recognized in the image may include not only the vehicle, but also, or alternatively, particular (or, alternatively, predetermined) objects related to (e.g., associated with) the vehicle, and according to some example embodiments, may also include various types of objects.

When receiving the second image through the image sensor 100 (e.g., the image sensor 100 generating the second image, see FIG. 1), the vanishing point extractor 310 (see FIG. 1) (specifically, the sample point extractor 311 (see FIG. 1)) may receive the first image IMG1, which is the previous frame of the second image stored IMG2 in the memory 200 (e.g., a most recently previously-generated image generated by the image sensor 100 prior to generating the second image IMG2, see FIG. 1), and information on the image IMG1. In addition, the vanishing point extractor 310 may identify an area of pixels corresponding to the vanishing point VP1 of the first image IMG1 and the object OB1 of the first image IMG1 using the information on the first image IMG1. Here, as shown in at least FIG. 4, the area corresponding to the object OB1 of the first image IMG1 may be implemented in the form of a bounding box according to some example embodiments.

Figure 5:
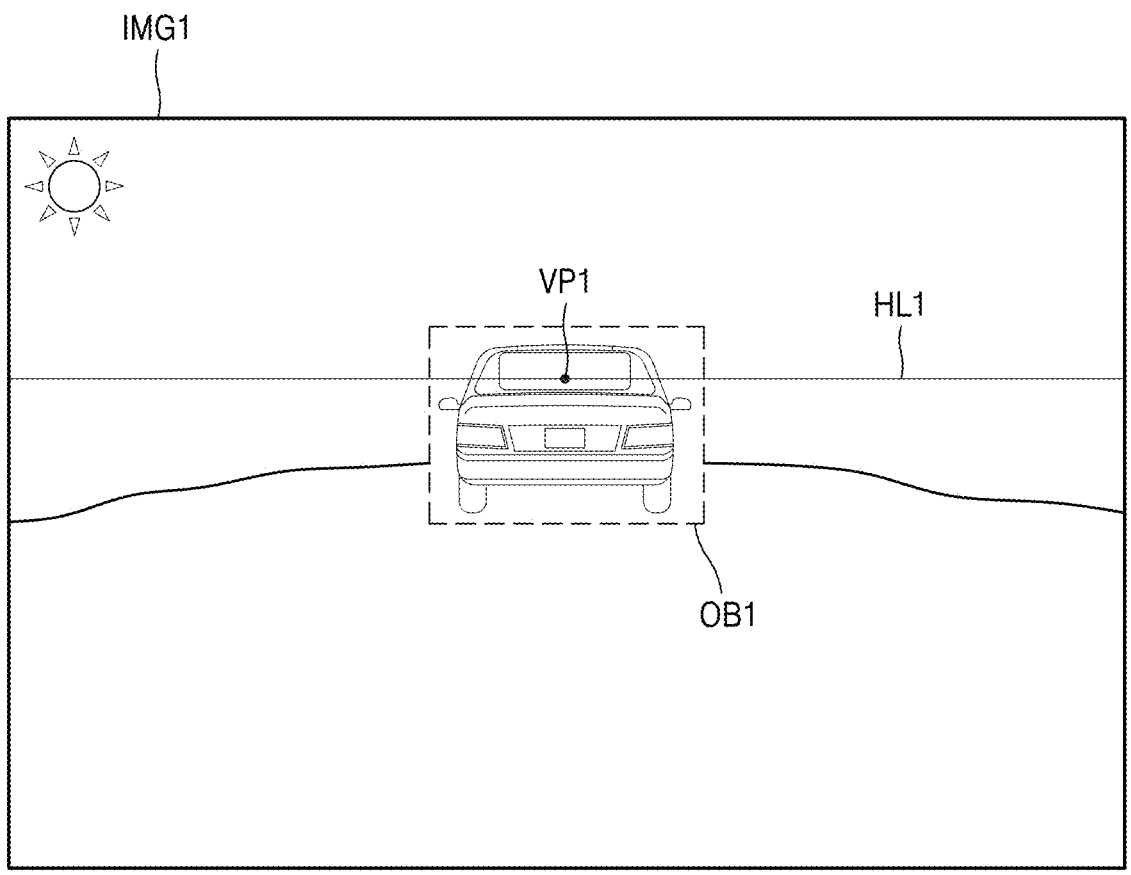
FIG. 5 is a diagram illustrating a straight line including a vanishing point of a first image according to some example embodiments of the present disclosure.

FIG. 5 is a diagram illustrating a straight line including a vanishing point of a first image according to some example embodiments of the present disclosure.

Referring to FIG. 5, a vanishing point extractor 310 (see FIG. 1) (specifically, the sample point extractor 311 (see FIG. 1)) may obtain a straight line including the vanishing point VP1 of the first image IMG1. Specifically, the vanishing point extractor 310 may obtain coordinates of pixels of the first image IMG1 constituting a straight line including the vanishing point VP1 of the first image IMG1 using the coordinates of the vanishing point VP1 of the first image IMG1. For example, referring to FIG. 5, the vanishing point extractor 310 may include a vanishing point VP1 of the first image IMG1 and obtain a horizontal line HL1 parallel to the horizontal axis of the first image IMG1 as the obtained straight line.

Figure 6:
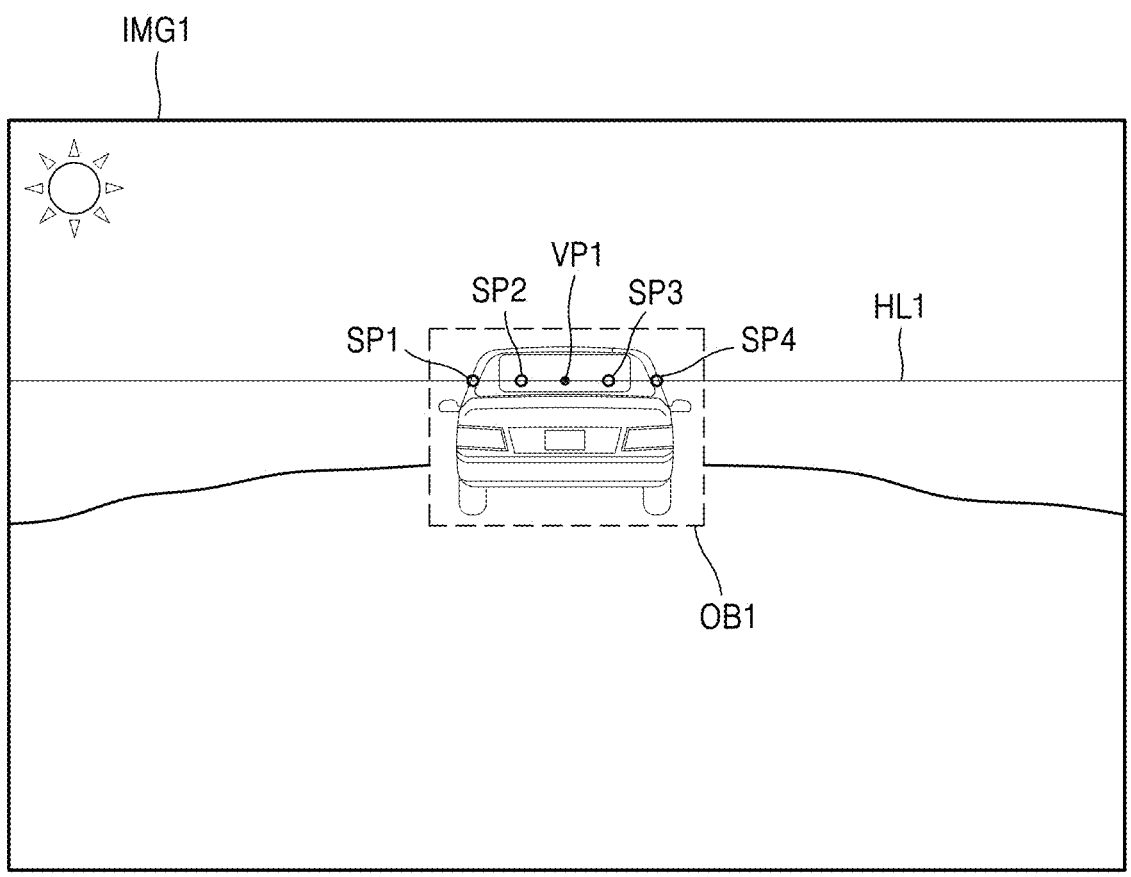
FIG. 6 is a diagram illustrating a plurality of sample points of a first image according to some example embodiments of the present disclosure.

FIG. 6 is a diagram illustrating a plurality of sample points of a first image according to some example embodiments of the present disclosure.

Referring to FIG. 6, the vanishing point extractor 310 (see FIG. 1) (specifically, the sample point extractor 311 (see FIG. 1)) may obtain a plurality of sample points SP1 to SP4 that intersect with the horizontal line HL1 of the first image IMG1 and the area corresponding to the object OB1 of the first image IMG1 simultaneously. Specifically, the vanishing point extractor 310 may identify pixels of the first image IMG1 having coordinates overlapping with the coordinates of the pixels constituting the horizontal line HL1 among pixels constituting the area of the object OB1 included in the first image IMG1, and obtain at least some of the identified overlapping pixels as a plurality of sample points SP1 to SP4 that intersect both the straight line (e.g., horizontal line HL1 and the object (e.g., the object within the area corresponding to the object OB1).

Moreover, the vanishing point extractor 310 may obtain at least some of the overlapping pixels as a plurality of sample points SP1 to SP4 in various ways. For example, the vanishing point extractor 310 may obtain a plurality of sample points SP1 to SP4 by randomly selecting a particular (or, alternatively, predetermined) number of pixels among overlapping pixels. As another example, the vanishing point extractor 310 may obtain a plurality of sample points SP1 to SP4 by selecting a preset number (e.g., quantity) of pixels according to a preset interval among overlapping pixels. Here, the preset number may be set according to the manufacturer or the user, and according to some example embodiments, the number may be set according to the size of the area of the object. Moreover, a method of obtaining at least some of overlapping pixels with a plurality of sample points is not limited to the above-described example.

Figure 7:
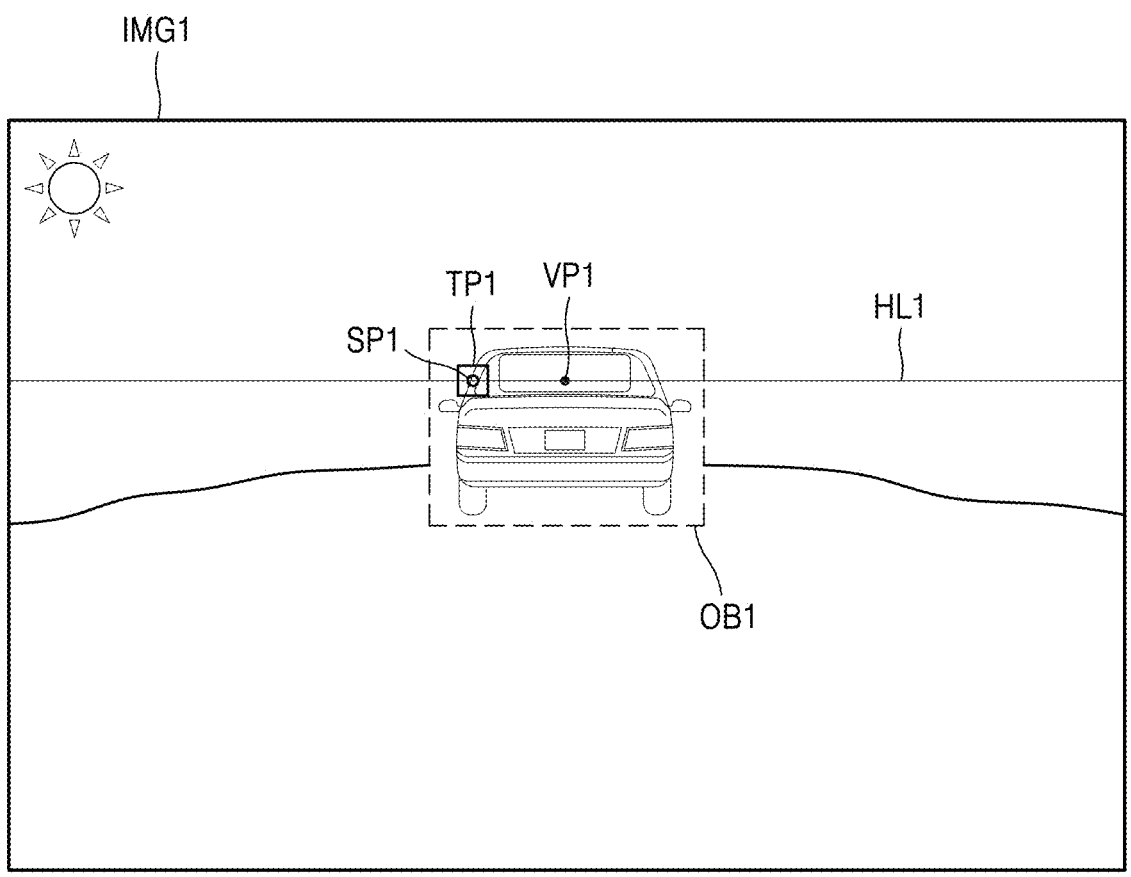
FIG. 7 is a diagram illustrating a first template corresponding to a sample point according to some example embodiments of the present disclosure.

FIG. 7 is a diagram illustrating a first template corresponding to a sample point according to some example embodiments of the present disclosure.

Referring to FIG. 7, a vanishing point extractor 310 (see FIG. 1) (specifically, the matching point extractor 313 (see FIG. 1)) may obtain a separate first template each corresponding to (e.g., including) a separate sample point of the plurality of sample points, such that a plurality of first templates are obtained each corresponding to (e.g., including) a separate sample point of the plurality of sample points of the first image. In some example embodiments, and as shown in FIG. 7, the vanishing point extractor 310 may include the coordinates of the first sample point SP1 and obtain an area having a particular (or, alternatively, predetermined) size (e.g., area) as the first template TP1, e.g., an area having a particular size and having the first sample point SP1 as a center point of the area, such that the first template TP1 may be understood to be centered on the first sample point SP1. In addition, although not illustrated in FIG. 7, the vanishing point extractor 310 may obtain a plurality of first templates respectively corresponding to (e.g., including, centered on, etc.) the remaining sample points SP2 to SP4 in FIG. 6.

The preset sizes (e.g., areas) of the plurality of first templates may be set according to the manufacturer or the user and the plurality of first templates may each have a same size. Moreover, the sizes of the plurality of first templates may be the same and may have different sizes according to embodiments. In addition, in FIG. 7, the first template TP1 is shown as a square shape having a sample point as a center point, but the present disclosure is not limited thereto, and the first template TP1 may have various forms.

Figure 8:
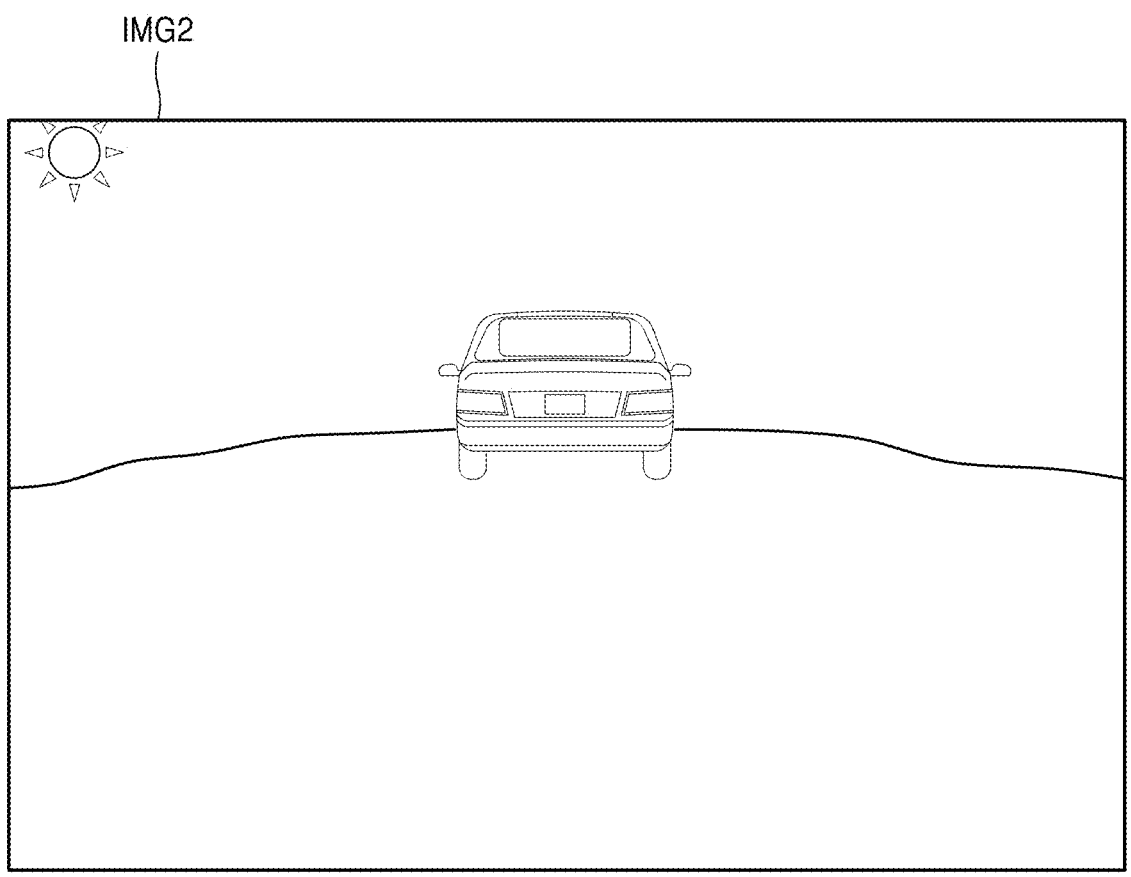
FIG. 8 is a diagram illustrating a second image that is a next frame of a first image according to some example embodiments of the present disclosure.

FIG. 8 is a diagram illustrating a second image that is a next frame of a first image according to some example embodiments of the present disclosure.

Referring to FIG. 8, the second image IMG2 is the next frame of the first image IMG1 (e.g., a next image generated by the image sensor 100 subsequently to generating the first image IMG1) and is an image of the front of the host vehicle 400 (see FIG. 3) like the first image IMG1. The host vehicle 400 may be shaken due to a crack in the road during operation, and thus, a difference may occur between images continuously captured by the image sensor 100.

Referring to FIG. 8, the second image IMG2 may represent an image downward from the first image IMG1 due to the shaking of the host vehicle 400, such that the positions of objects that are included in both the first image IMG1 and the second image IMG2 may be located at different locations in the first and second images IMG1 and IMG2.

Figure 9:
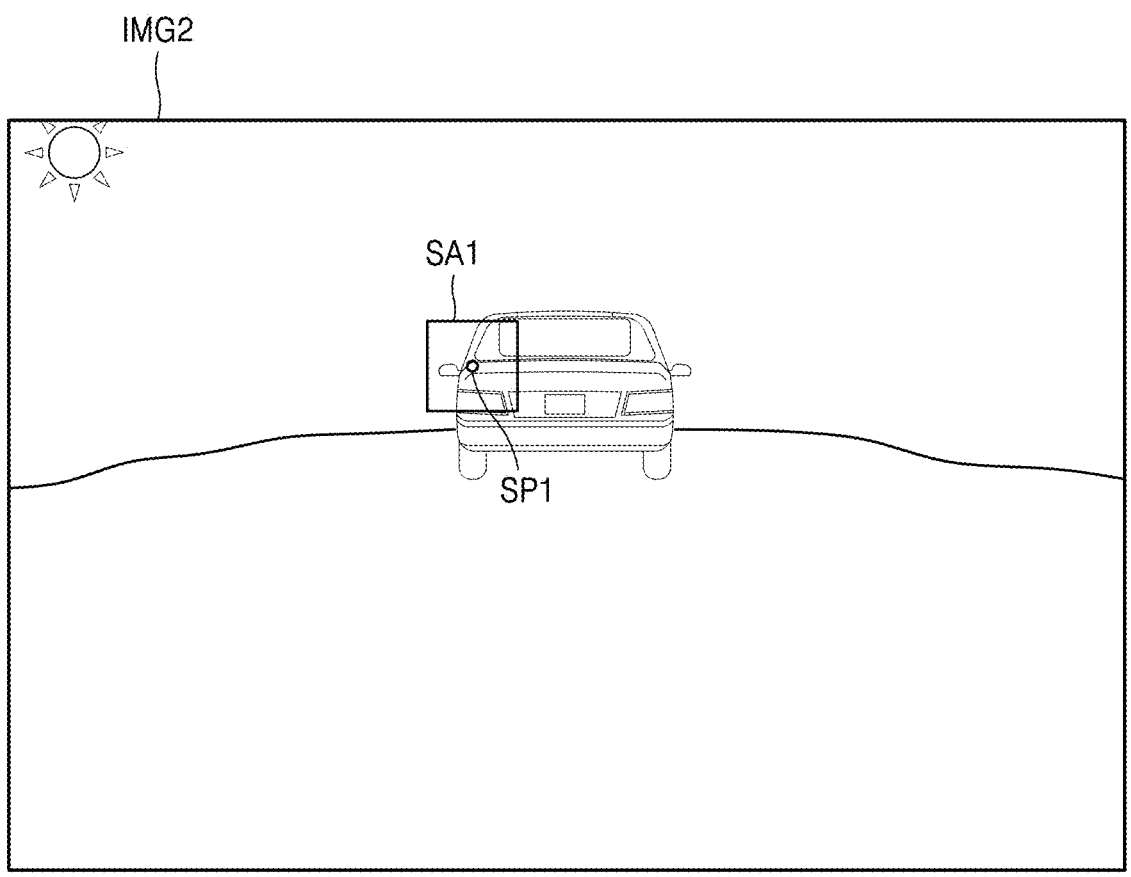
FIG. 9 is a diagram illustrating a search area of a second image according to some example embodiments of the present disclosure.

FIG. 9 is a diagram illustrating a search area of a second image according to some example embodiments of the present disclosure.

The vanishing point extractor 310 (see FIG. 1) (specifically, the matching point extractor 313 (see FIG. 1)) may identify a plurality of search areas in the second image IMG2, the search areas corresponding to separate, respective sample points of the plurality of sample points SP1 to SP4 of the first image (see FIG. 6).

Specifically, the vanishing point extractor 310 may identify, in the second image IMG2, the points (e.g., pixels) having the same coordinates in the second image IMG2 as the coordinates of separate, respective sample points of the plurality of sample points SP1 to SP4 in the first image IMG1. For example, as shown in FIG. 9, a point in the second image IMG2 having the same coordinates in the second image IMG2 as the coordinates of the first sample point SP1 in the first image IMG1 is determined. In addition, the vanishing point extractor 310 may obtain an area including (e.g., centered on) each of the identified points and having a particular (or, alternatively, predetermined) size as a plurality of search areas (e.g., each search area may include a separate sample point of the plurality of sample points SP1 to SP4 at the center of the search area). Accordingly, each separate search area in the second image IMG2 will be understood to correspond to a separate, respective sample point of the plurality of sample points SP1 to SP4 of the first image IMG1. The preset size of the plurality of search areas may be set according to the manufacturer or the user. Also, the plurality of search areas may each be larger in size (e.g., area) than the size of at least one, or all, first templates of the plurality of first templates. In addition, the sizes of the plurality of search areas may be the same and may have different sizes according to embodiments.

For example, referring to FIG. 9, the vanishing point extractor 310 may identify, in the second image IMG2, a point (e.g., pixel) having the same coordinates in the second image IMG2 as the coordinates of the pixel of the sample point SP1 of the first image IMG1 and obtain an area including the identified point as a search area SA1 corresponding to (e.g., centered on) the sample point SP1. Moreover, in FIG. 9, the search area SA1 corresponding to the sample point SP1 is shown as a square shape having the sample point SP1 as a center point, such that the search area SA1 is understood to be centered on the sample point SP1, but the present disclosure is not limited thereto, and the search area SA1 may have various forms.

Figure 10:
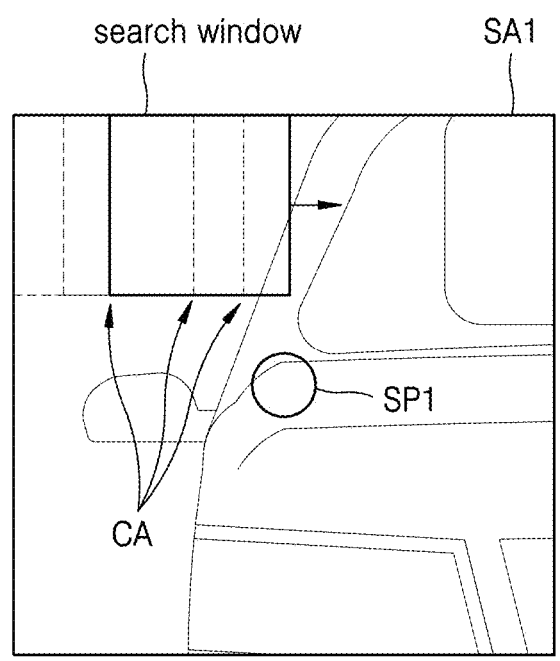
FIG. 10 is a diagram for explaining a patch matching operation for a second image according to some example embodiments of the present disclosure.

FIG. 10 is a diagram for explaining a patch matching operation for a second image according to some example embodiments of the present disclosure.

The vanishing point extractor 310 (see FIG. 1) (specifically, the matching point extractor 313 (see FIG. 1)) may identify an area similar to the first template corresponding to each sample point, within the search area corresponding to each sample point. The vanishing point extractor 310 may perform patch matching to identify an area similar to the first template. As described herein, an area may be determined to be "similar" to the first template in response to a determination that the pixels of the area match the pixels of the first template within a particular confidence and/or margin (e.g., at least a 90% match between the pixels of the area and the pixels of the first template).

Specifically, referring to FIG. 10, the vanishing point extractor 310 may determine a plurality of candidate areas CA partitioned by a search window having the same size (e.g., area) as the first template of the sample point SP1 in the search area SA1 corresponding to the sample point SP1. Also, the vanishing point extractor 310 may calculate a correlation value between each of the plurality of candidate areas and the first template TP1 to establish a plurality of correlation values. In addition, the vanishing point extractor 310 may identify a candidate area having the highest correlation value out of the plurality of correlation values.

A correlation value may be determined based on implementing one or more various image correlation techniques (e.g., digital image correlation) where the correlation value, which may be referred to as a "correlation coefficient", indicates a relative similarity between a candidate area and a first template compared therewith. For example, a correlation value determined based on comparing a candidate area CA with a first template TP1 may be 0.95, indicating a 95% similarity, or a match with 95% confidence, between the pixels of the candidate area CA and the pixels of the first template TP1. The candidate area CA may be determined to be "similar" to the first template TP1 in response to a determination that the correlation value determined based on comparing a candidate area CA with a first template TP1 is greater than a particular (or, alternatively, predetermined) threshold value. For example, when the aforementioned correlation value that is determined based on comparing a candidate area CA with a first template TP1 is 0.95, and the threshold value is 0.90, the candidate area CA may thus be determined to be "similar" to the first template TP1.

Figure 11:
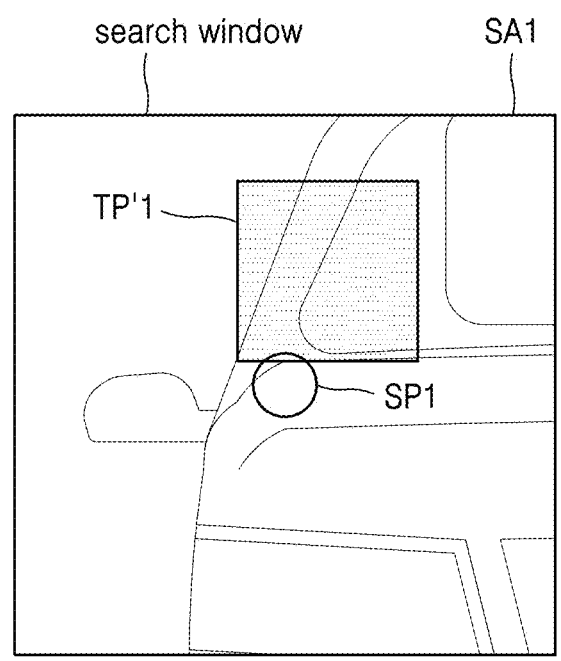
FIG. 11 is a diagram illustrating a second template corresponding to a sample point according to some example embodiments of the present disclosure.

FIG. 11 is a diagram illustrating a second template corresponding to a sample point according to some example embodiments of the present disclosure.

Referring to FIG. 11, the vanishing point extractor 310 (see FIG. 1) (specifically, the matching point extractor 313 (see FIG. 1)) calculates a correlation value with the first template TP1 for a plurality of candidate areas CA partitioned by a search window in the search area SA1 corresponding to the sample point SP1 (e.g., though implementing digital image correlation between the first template TP1 and each of the candidate areas), compare the resulting correlation values corresponding to the separate, respective candidate areas CA that are compared with the first template TP1, and determine a candidate area CA having the highest correlation value of the correlation values of the plurality of candidate areas CA as the second template TP'1. Such a process may be repeated with regard to each separate first template TP1. Accordingly, for each sample point SP1 to SP4 (e.g., sample point SP1), a candidate area CA in the particular search area SA corresponding to the sample point (e.g., SA1) that is determined to be similar to the corresponding first template corresponding to the same sample point (e.g., TP1) may be determined to be a second template (e.g., TP'1). Thus, at least one second template TP'1 may be obtained from the second image IMG2, here the at least one second template TP'1 is determined to be "similar" to at least one first template TP1 of the first image.

Moreover, according to some example embodiments, when correlation values calculated for a plurality of candidate areas CA do not exceed a particular (or, alternatively, predetermined) value (e.g., threshold correlation value), the vanishing point extractor 310 may determine that the second template does not exist. Therefore, the number (quantity) of matching points may be less than the number of sample points. Here, the preset value may mean a value that may be determined to be difficult to be regarded as similar because the correlation value with the first template is low and may be set by a manufacturer or a user.

Figure 12:
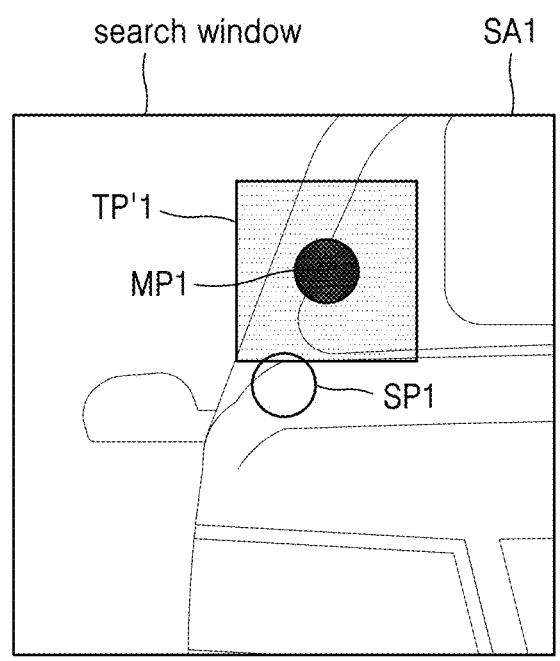
FIG. 12 is a diagram illustrating a matching point of a second template according to some example embodiments of the present disclosure.

FIG. 12 is a diagram illustrating a matching point of a second template according to some example embodiments of the present disclosure.

The vanishing point extractor 310 (see FIG. 1) (specifically, the matching point extractor 313 (see FIG. 1)) may obtain a second template and obtain one of the pixels included in and/or associated with the obtained second template as a matching point. The process may be repeated for each second template TP'1 of the second image, such that at least one matching point is obtained as a pixel in the second image IMG2 that is associated with at least one second template TP'1 of the second image IMG2.

For example, referring to FIG. 12, the vanishing point extractor 310 may obtain a pixel corresponding to a center point among pixels included in the second template TP'1 (e.g., the pixel at the center point of the second template TP'1) as a matching point MP1 corresponding to the sample point SP1. Moreover, a method of obtaining one of the pixels included in the second template as a matching point is not limited to the above-described example, and a matching point may be obtained in various ways.

Figure 13:
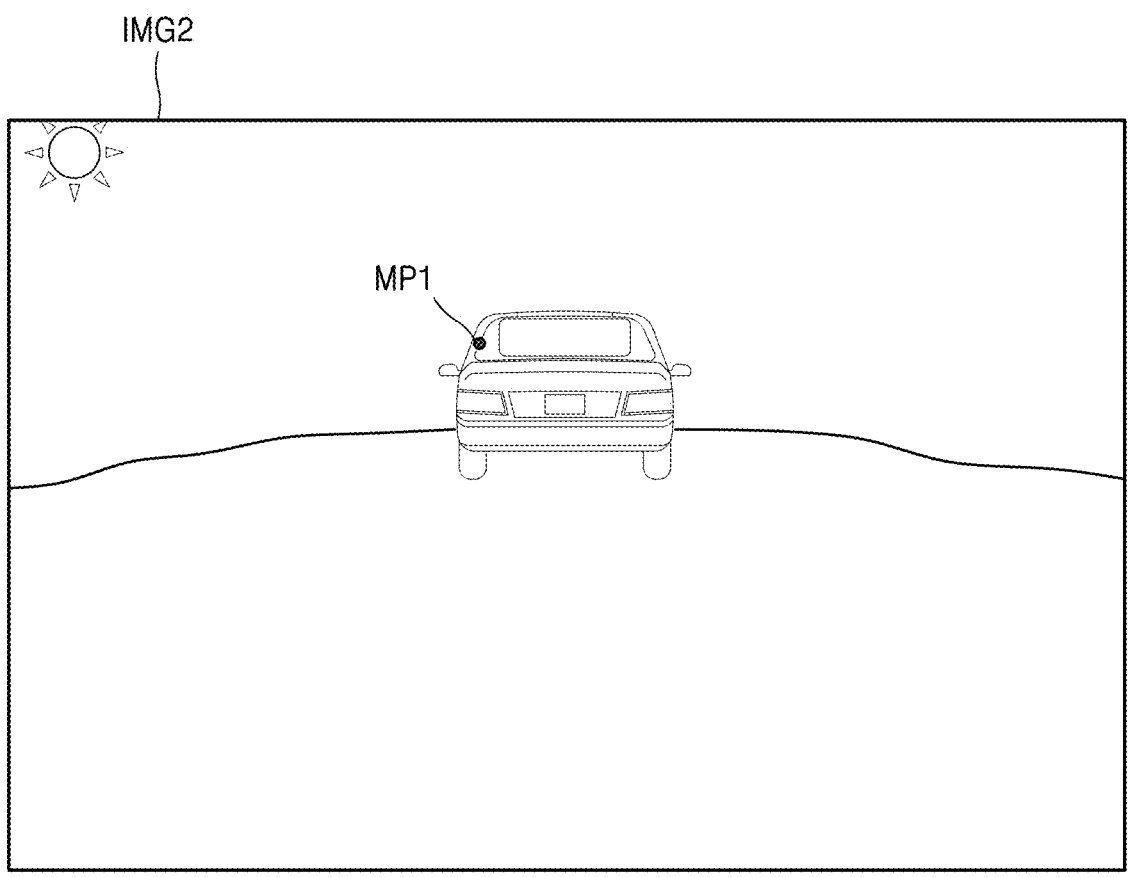
FIG. 13 is a diagram illustrating a matching point of a second image according to some example embodiments of the present disclosure.

FIG. 13 is a diagram illustrating a matching point of a second image according to some example embodiments of the present disclosure.

Referring to FIG. 13, the vanishing point extractor 310 (see FIG. 1) (specifically, the matching point extractor 313 (see FIG. 1)) may obtain a matching point MP1 of the second image IMG2 corresponding to the sample point SP1 of the first image IMG1. The vanishing point extractor 310 may also perform the above-described matching point extraction operation on the remaining sample points SP2 to SP4 of the first image IMG1.

Figure 14:
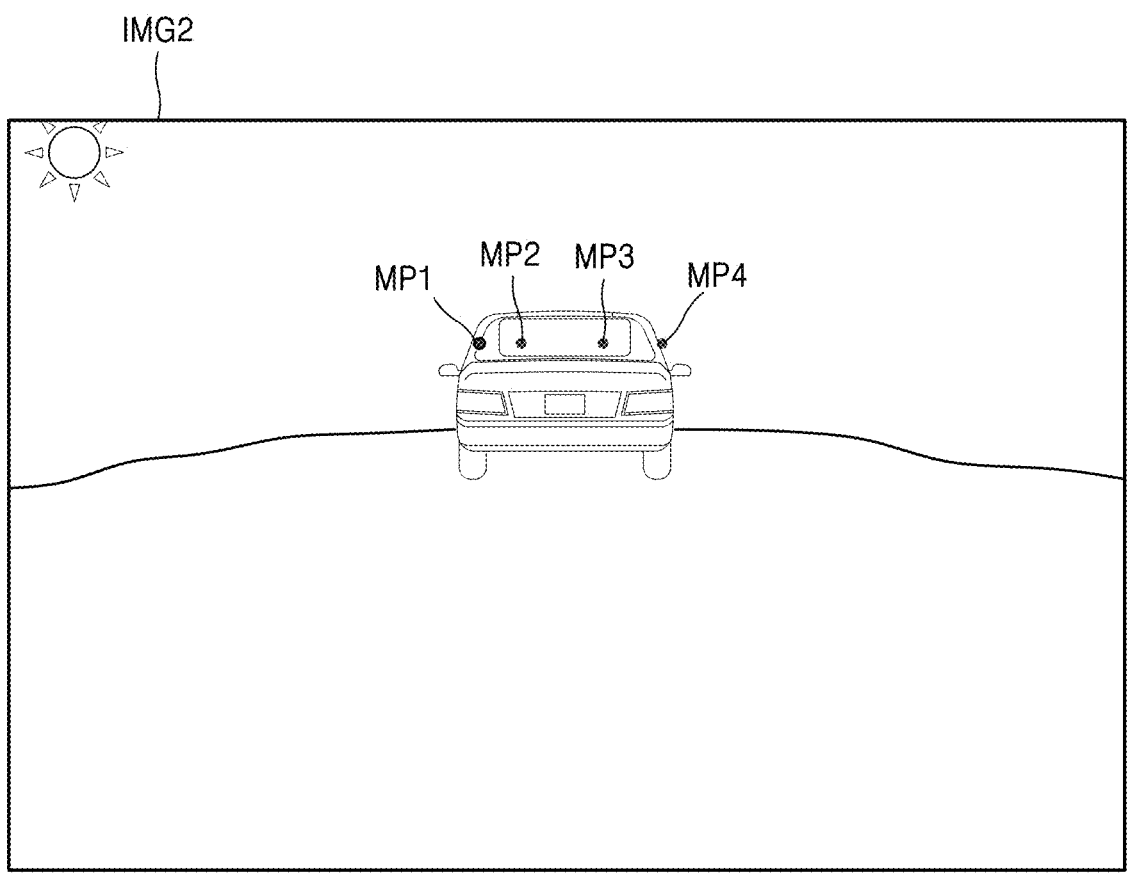
FIG. 14 is a diagram illustrating a plurality of matching points of a second image according to some example embodiments of the present disclosure.

FIG. 14 is a diagram illustrating a plurality of matching points of a second image according to some example embodiments of the present disclosure.

Referring to FIG. 14, it may be confirmed that the vanishing point extractor 310 (see FIG. 1) (specifically, the matching point extractor 313 (see FIG. 1)) obtains a plurality of matching points MP1 to MP4 respectively corresponding to the plurality of sample points SP1 to SP4 of the first image IMG1.

In addition, the vanishing point extractor 310 (specifically, the vanishing point corrector 315 (see FIG. 1)) may obtain a vanishing point of the second image IMG2 using a plurality of matching points MP1 to MP4.

Figure 15:
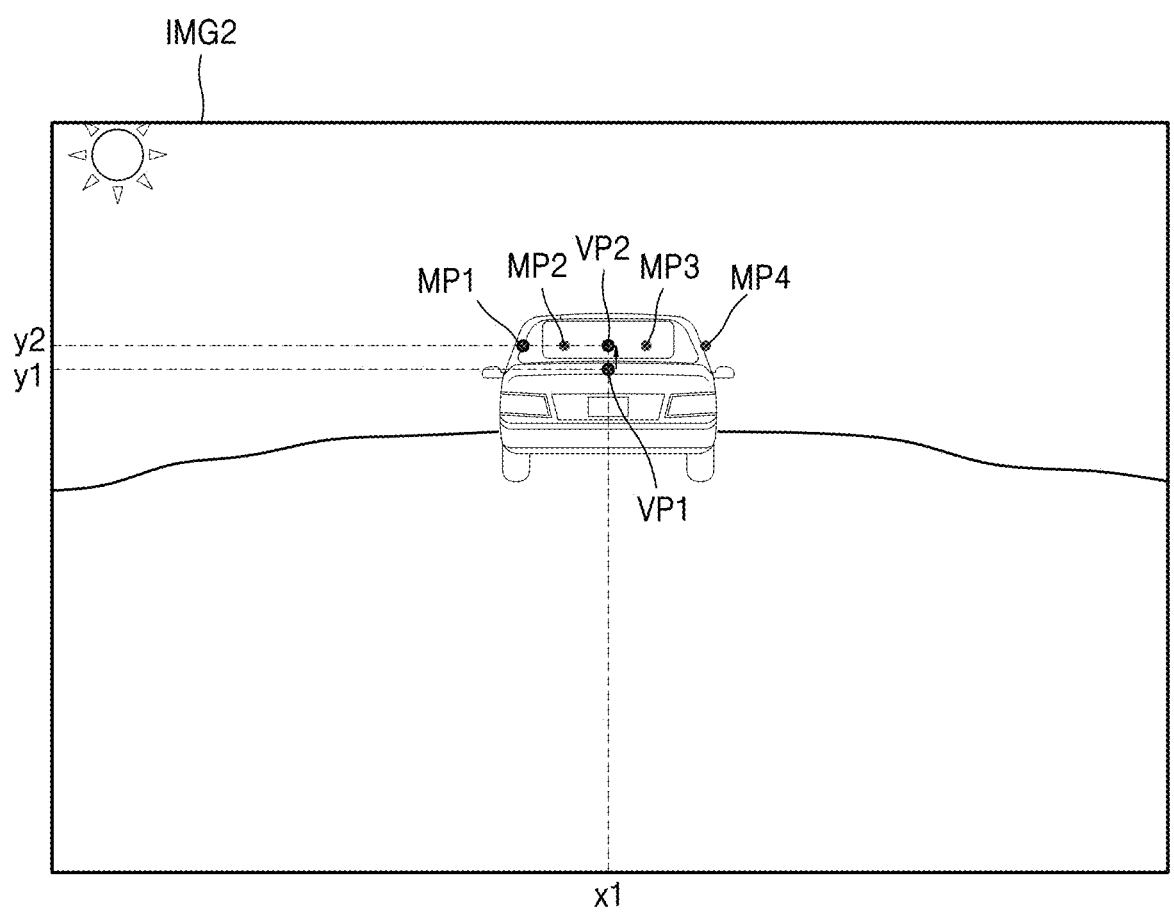
FIG. 15 is a diagram illustrating a vanishing point of a second image according to some example embodiments of the present disclosure.

FIG. 15 is a diagram illustrating a vanishing point of a second image according to some example embodiments of the present disclosure.

Referring to FIG. 15, the vanishing point extractor 310 (specifically, the vanishing point corrector 315 (see FIG. 1)) may obtain a vanishing point VP2 of the second image IMG2 by (e.g., based on) correcting the vanishing point VP1 of the first image IMG1 (e.g., adjusting coordinates of the vanishing point VP1 in the second image to new, corrected coordinates in the second image IMG2 to establish the vanishing point VP2) using a plurality of matching points MP1 to MP4.

In some example embodiments, the vanishing point extractor 310 may calculate an average of coordinates of a plurality of matching points MP1 to MP4 and correct (e.g., adjust) the coordinates of the vanishing point VP1 of the first image IMG1 using the calculated y-coordinate of the average coordinate in order to establish the vanishing point VP2 as the point having the corrected coordinates in the second image IMG2. Accordingly, the vanishing point VP2 may be obtained based on correcting (e.g., adjusting) a y-coordinate to the vanishing point VP1 based on y-coordinates of at least one matching point (e.g., some or all of matching points MP1 to MP4). Furthermore, a method of correcting the vanishing point VP1 of the first image IMG1 using the average coordinates may differ depending on the type of a straight line including the vanishing point of the first image IMG1 described above with reference to FIG. 5.

For example, referring to FIGS. 5 and 15, a straight line including a vanishing point of the first image IMG1 may be a horizontal line parallel to the horizontal axis. In this case, the vanishing point extractor 310 corrects the y-coordinate y1 of the vanishing point VP1 of the first image IMG1 to be the y-coordinate y2 of the average coordinates of the plurality of matching points MP1 to MP4 thereby obtaining a vanishing point VP2 of the second image IMG2. At this time, the x-coordinate x1 of the vanishing point VP1 of the first image IMG1 may not perform correction. Accordingly, the x-coordinate of the vanishing point VP2 of the second image IMG2 may be the same as the x-coordinate x1 of the vanishing point VP1 of the first image IMG1.

As another example, a straight line including a vanishing point of the first image IMG1 may be a parallel line parallel to the vertical axis. In this case, the vanishing point extractor 310 corrects the x-coordinate of the vanishing point VP1 of the first image IMG1 to be the x-coordinate of the average coordinates of the plurality of matching points MP1 to MP4 thereby obtaining a vanishing point VP2 of the second image IMG2. At this time, the y-coordinate of the vanishing point VP1 of the first image IMG1 may not perform correction. Accordingly, the y-coordinate of the vanishing point VP2 of the second image IMG2 may be the same as the y-coordinate of the vanishing point VP1 of the first image IMG1.

As another example, a straight line including the vanishing point of the first image IMG1 may be a diagonal line. In this case, coordinate change values ($\Delta x$, $\Delta y$) between the coordinates of each sample point and the corresponding matching point may be calculated, the average of the calculated coordinate change values may be calculated, and the vanishing point VP2 of the second image IMG2 may be obtained by reflecting the average coordinate change value to the vanishing point VP1 of the first image IMG1.

Figure 16:
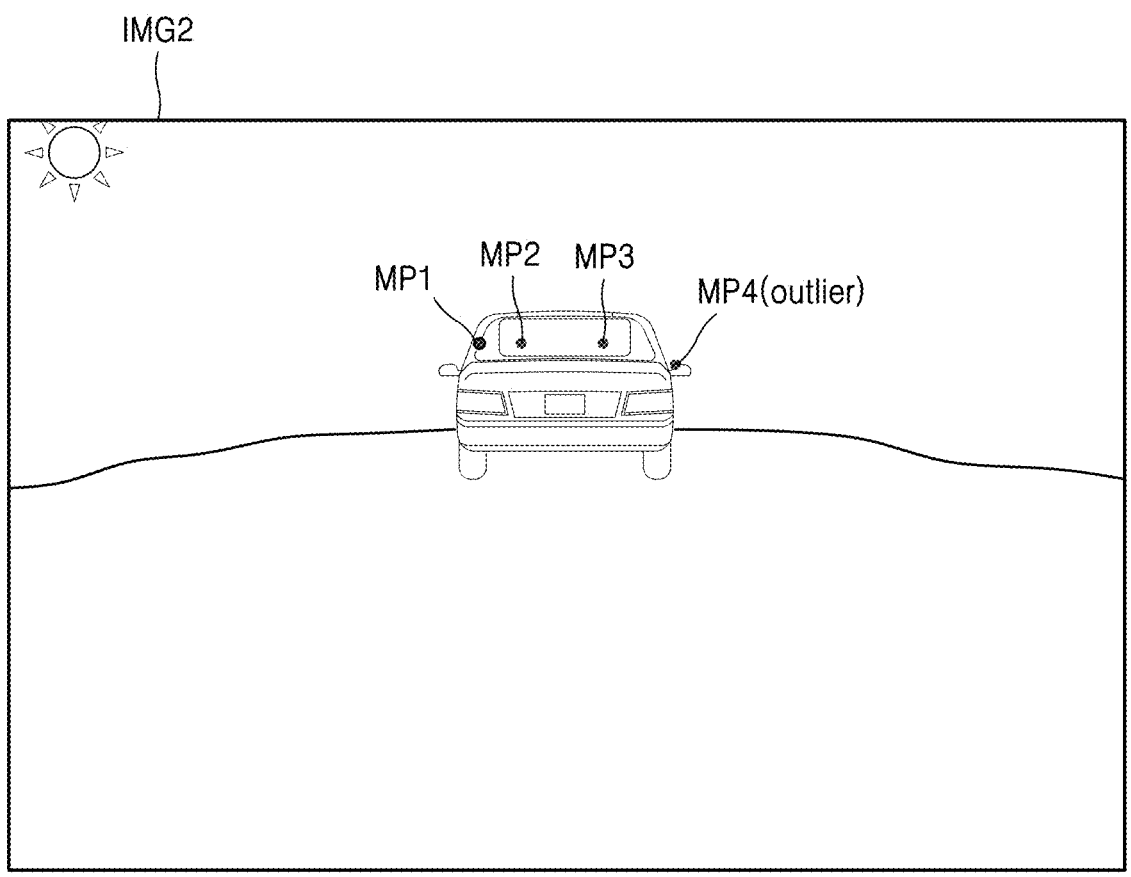
FIG. 16 is a diagram illustrating a plurality of matching points of a second image according to some example embodiments of the present disclosure.

FIG. 16 is a diagram illustrating a plurality of matching points of a second image according to some example embodiments of the present disclosure.

The vanishing point extractor 310 (see FIG. 1) (specifically, the matching point extractor 313 (see FIG. 1)) may obtain a plurality of matching points MP1 to MP4 from the second image IMG2. However, the plurality of matching points MP1 to MP4 may also include a matching point corresponding to an outlier in some cases. Here, the outlier may mean a matching point that deviates significantly (e.g., more than 10%, more than a standard deviation $\sigma$, or the like) from an average value of a plurality of matching points (e.g., the deviation of vertical coordinates (e.g., y-coordinate) of the outlier matching point MP4 from the average vertical coordinates of the matching points MP1 to MP4 may be greater than one standard deviation $\sigma$). For example, referring to FIG. 16, the vanishing point extractor 310 may obtain a plurality of matching points MP1 to MP4 including a matching point MP4 corresponding to the outlier.

Because the vanishing point extractor 310 extracts the vanishing point VP2 of the second image IMG2 using the average coordinates of the matching points, if the outliers are included in the matching points, the vanishing point extractor 310 may extract the vanishing point VP2 of the second image accompanying the error. Therefore, the vanishing point extractor 310 may additionally perform an operation of removing the outliers for the plurality of matching points MP1 to MP4.

As some example embodiments, the vanishing point extractor 310 may remove the matching point MP4 corresponding to the outlier by applying an outlier removal model to coordinates of a plurality of matching points MP1 to MP4. Here, the outlier removal model may be at least one of RANdom SAmple Consensus (RANSAC) model, PROgressive SAmple Consensus (PROSAC) model, or Stable random sample consensus (StaRSaC) model, and the type of the outlier removal model is not limited to the above.

The removal operation of the outlier described above may be performed by the matching point extractor 313 of the vanishing point extractor 310. For example, the matching point extractor 313 may obtain at least one matching point matching a plurality of sample points and perform an operation of removing outliers from the obtained at least one matching point. In addition, the matching point extractor 313 may transmit at least one matching point from which the outlier is removed to the vanishing point corrector 315.

Moreover, according to some example embodiments, the vanishing point corrector 315 of the vanishing point extractor 310 may perform the above-described removal of the outlier. For example, if at least one matching pointer including an outlier is received from the matching point extractor 313, the vanishing point corrector 315 may perform an operation of removing the outlier among at least one matching point received.

Figure 17:
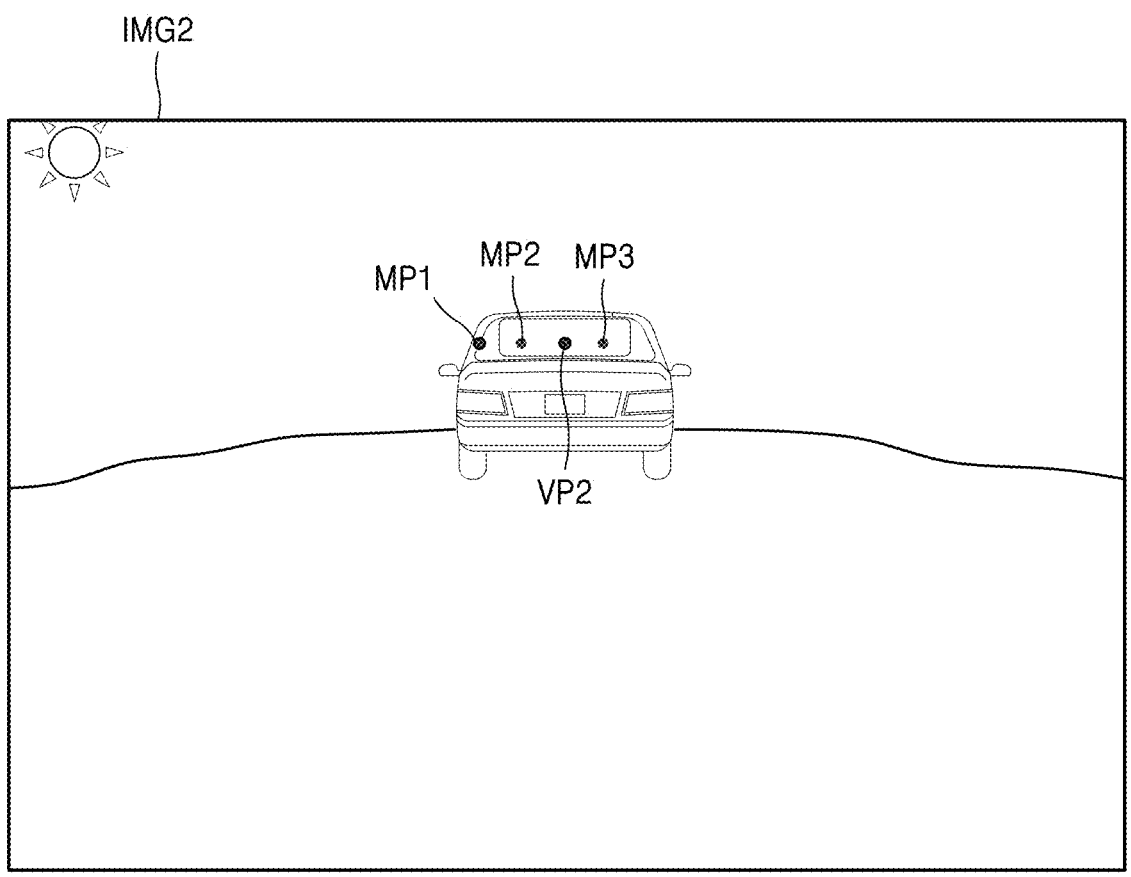
FIG. 17 is a diagram illustrating a vanishing point of a second image according to some example embodiments of the present disclosure.

FIG. 17 is a diagram illustrating a vanishing point of a second image according to some example embodiments of the present disclosure. In detail, FIG. 17 is a diagram for explaining an operation of obtaining a vanishing point VP2 of the second image IMG2 using the plurality of matching points MP1 to MP3 of FIG. 16.

Referring to FIG. 17, the vanishing point extractor 310 (specifically, the vanishing point corrector 315 (see FIG. 1)) may obtain a vanishing point VP2 of the second image IMG2 by correcting the vanishing point VP1 of the first image IMG1 using the plurality of matching points MP1 to MP3 from which the outlier is removed.

The vanishing point extractor 310 may calculate the average of the coordinates of the plurality of matching points MP1 to MP3 from which the outlier has been removed and correct the vanishing point VP1 of the first image IMG1 using the calculated y-coordinate of the average coordinate, thereby obtaining a vanishing point VP2 of the second image IMG2.

Figure 18:
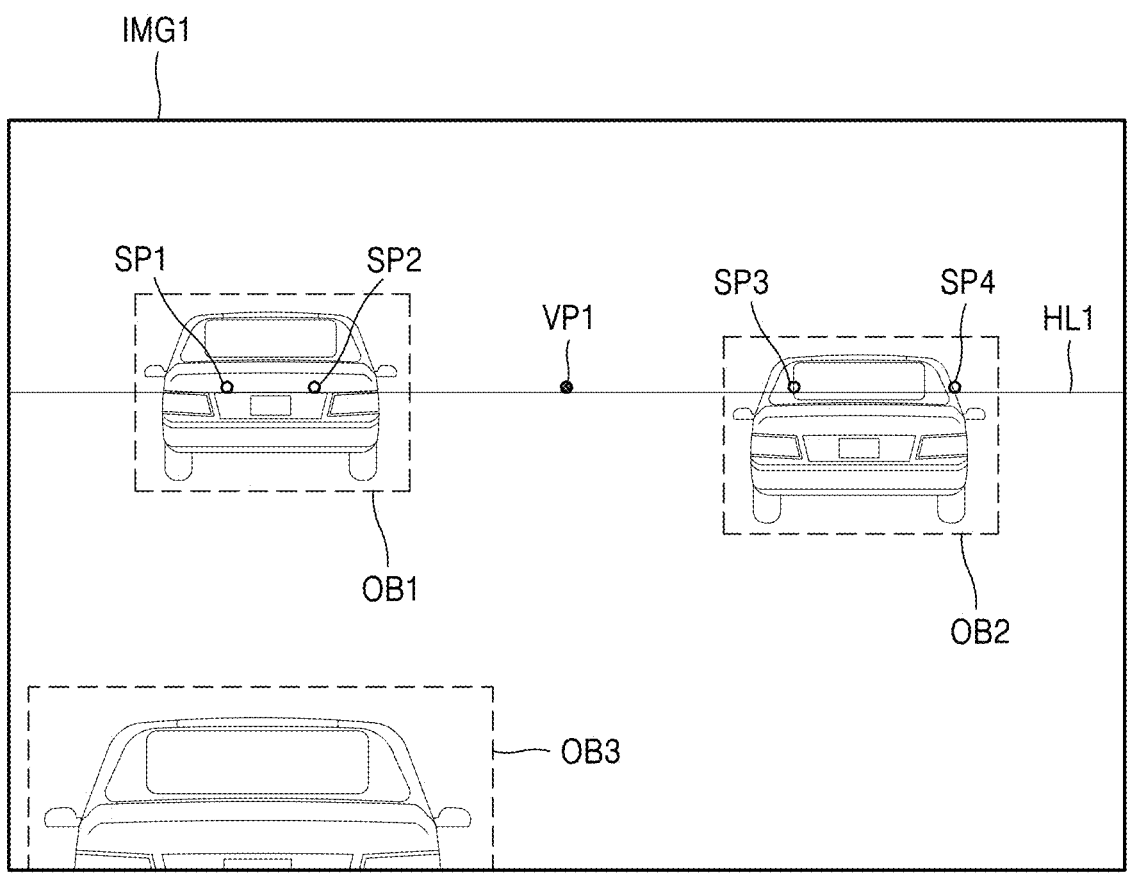
FIG. 18 is a diagram illustrating a plurality of sample points of a first image according to some example embodiments of the present disclosure.

FIG. 18 is a diagram illustrating a plurality of sample points of a first image according to some example embodiments of the present disclosure. Specifically, FIG. 18 is a diagram for explaining an operation of extracting a plurality of sample points SP1 to SP4 of a first image IMG1 when a plurality of objects OB1, OB2, and OB3 are included in the first image IMG1.

Referring to FIG. 18, the vanishing point extractor 310 (see FIG. 1) (specifically, the sample point extractor 311 (see FIG. 1)) may obtain a straight line including the vanishing point VP1 of the first image IMG1. For example, referring to FIG. 18, the vanishing point extractor 310 may include a vanishing point VP1 of the first image IMG1 and obtain a horizontal line HL1 parallel to the horizontal axis of the first image IMG1.

Then, the vanishing point extractor 310 (see FIG. 1) (specifically, the sample point extractor 311 (see FIG. 1)) may obtain a plurality of sample points that intersect with the horizontal line HL1 of the first image IMG1 and the area corresponding to the plurality of objects OB1, OB2, and OB3 of the first image IMG1 simultaneously. For example, referring to FIG. 18, the vanishing point extractor 310 may extract a plurality of sample points SP1 and SP2 among pixels simultaneously intersecting with the area corresponding to the first object OB1 and the horizontal line HL1. In addition, the vanishing point extractor 310 may extract a plurality of sample points SP3 and SP4 from pixels that intersect with the area corresponding to the second object OB2 and the horizontal line HL1 simultaneously. Moreover, because pixels corresponding to the area corresponding to the third object OB3 and the horizontal line HL1 simultaneously do not exist, the vanishing point extractor 310 cannot extract additional sample points.

In such a way, the vanishing point extractor 310 may extract a plurality of sample points even when the first image IMG1 includes a plurality of objects OB1, OB2, and OB3. In addition, as described above with reference to FIGS. 7 to 15, the vanishing point extractors 310 may extract at least one matching point corresponding to a plurality of extracted sample points from the second image IMG2 and extract a vanishing point VP2 of the second image IMG2 using at least one extracted matching point.

Figure 19:
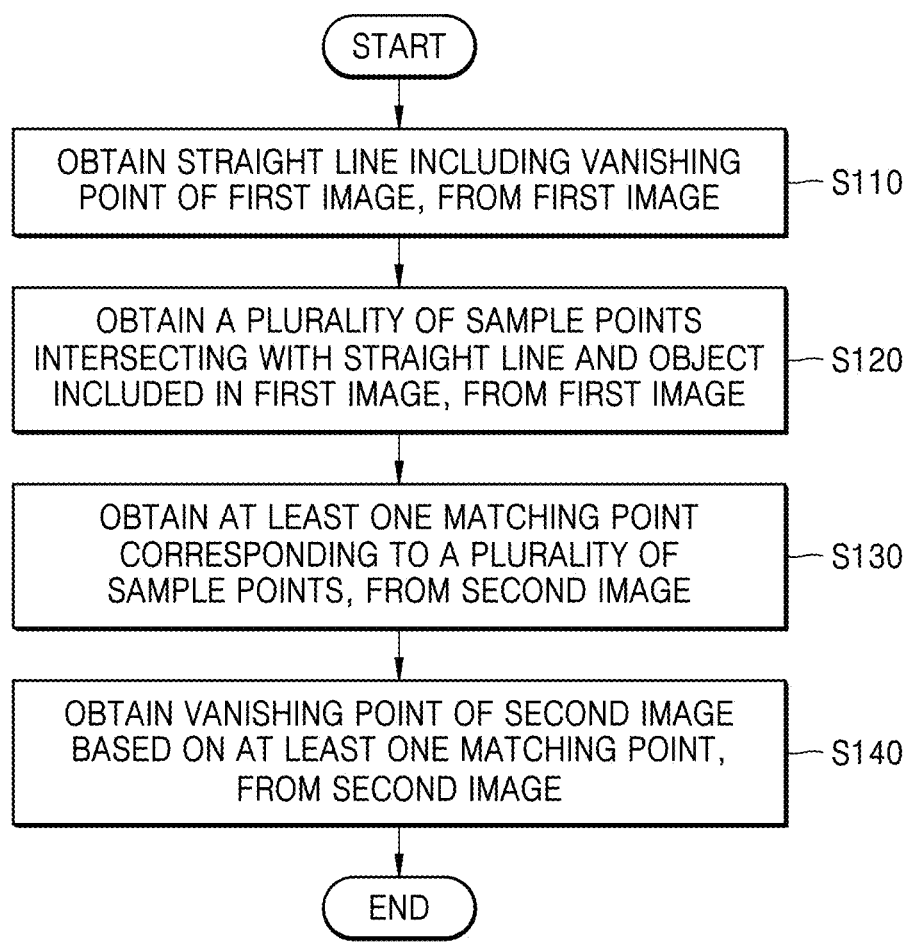
FIG. 19 is a flowchart illustrating a vanishing point extraction method according to some example embodiments of the present disclosure.

FIG. 19 is a flowchart illustrating a vanishing point extraction method according to some example embodiments of the present disclosure. Specifically, FIG. 19 is a flowchart illustrating an example of a vanishing point extraction method of (e.g., implemented by) the vanishing point extraction device 10 of FIG. 1, the vanishing point extraction device 10 of FIG. 2, the autonomous driving device 500 of FIG. 20, processing circuitry implementing, included in, and/or including any of said devices, and/or any parts thereof, or the like. At least a part of the vanishing point extraction method according to the example embodiments shown in FIG. 19 may be performed by the processor 300 of FIG. 1, the processor 300 of FIG. 2, the processor 530 of FIG. 20, the main processor 550 of FIG. 20, and/or any parts thereof, or the like.

Referring to FIGS. 1 and 19, first, the vanishing point extraction device 10 may obtain a straight line including the vanishing point of the first image from the first image (S110) (e.g., based on processing the first image), for example as described herein with reference to FIGS. 4-5. In some example embodiments, the straight line including the vanishing point of the first image includes the vanishing point of the first image, and the vanishing point extraction device 10 may obtain a horizontal line parallel to the horizontal axis of the first image.

In addition, the vanishing point extraction device 10 may obtain a plurality of sample points intersecting with the straight line and the object included in the first image from the first image (S120), for example as described herein with reference to FIG. 6. Specifically, the vanishing point extraction device 10 may identify pixels having coordinates overlapping with those of pixels constituting the straight line among pixels of an area of an object included in the first image and obtain some or all of the identified pixels as a plurality of sample points intersecting both the straight light and the object included in the first image. Here, the object included in the first image may include an object recognized as a vehicle or a particular (or, alternatively, predetermined) object associated with the vehicle.

In addition, the vanishing point extraction device 10 may obtain at least one matching point matching a plurality of sample points from a second image that is a next image of the first image (S130), for example as described herein with reference to FIGS. 7-14. Specifically, the vanishing point extraction device 10 may obtain a plurality of first templates respectively corresponding to the plurality of sample points (e.g., each first template may have a separate area of the first image and a separate sample point as a center point of the respective first template). Each of the plurality of first templates may include a corresponding sample point and have a particular (or, alternatively, predetermined) size (e.g., area and/or shape). In addition, the vanishing point extraction device 10 may obtain at least one second template similar to at least one of the plurality of first templates from the second image by comparing each of the plurality of first templates with the second image (e.g., comparing the first templates with candidate areas of the second image, and, for each first template, e.g., via performing digital image correlation, determining that a corresponding candidate area of the second image having a highest correlation value (e.g., highest similarity with the first template) is a corresponding second template of the second image. In addition, the vanishing point extraction device 10 may obtain at least one matching point from at least one second template. For example, each separate matching point may correspond to (e.g., may be determined as) the center point of the corresponding second template.

In addition, the vanishing point extraction device 10 may obtain a vanishing point of the second image based on at least one matching point from (e.g., of) the second image (S140), for example as described herein with reference to FIG. 15. Specifically, the vanishing point extraction device 10 may obtain a vanishing point of the second image by correcting the vanishing point of the first image based on at least one matching point. For example, the vanishing point extraction device 10 may calculate an average y-coordinate of at least one matching point, and extract the vanishing point of the second image by changing the y-coordinate of the vanishing point of the first image to the calculated y-coordinate.

Figure 20:
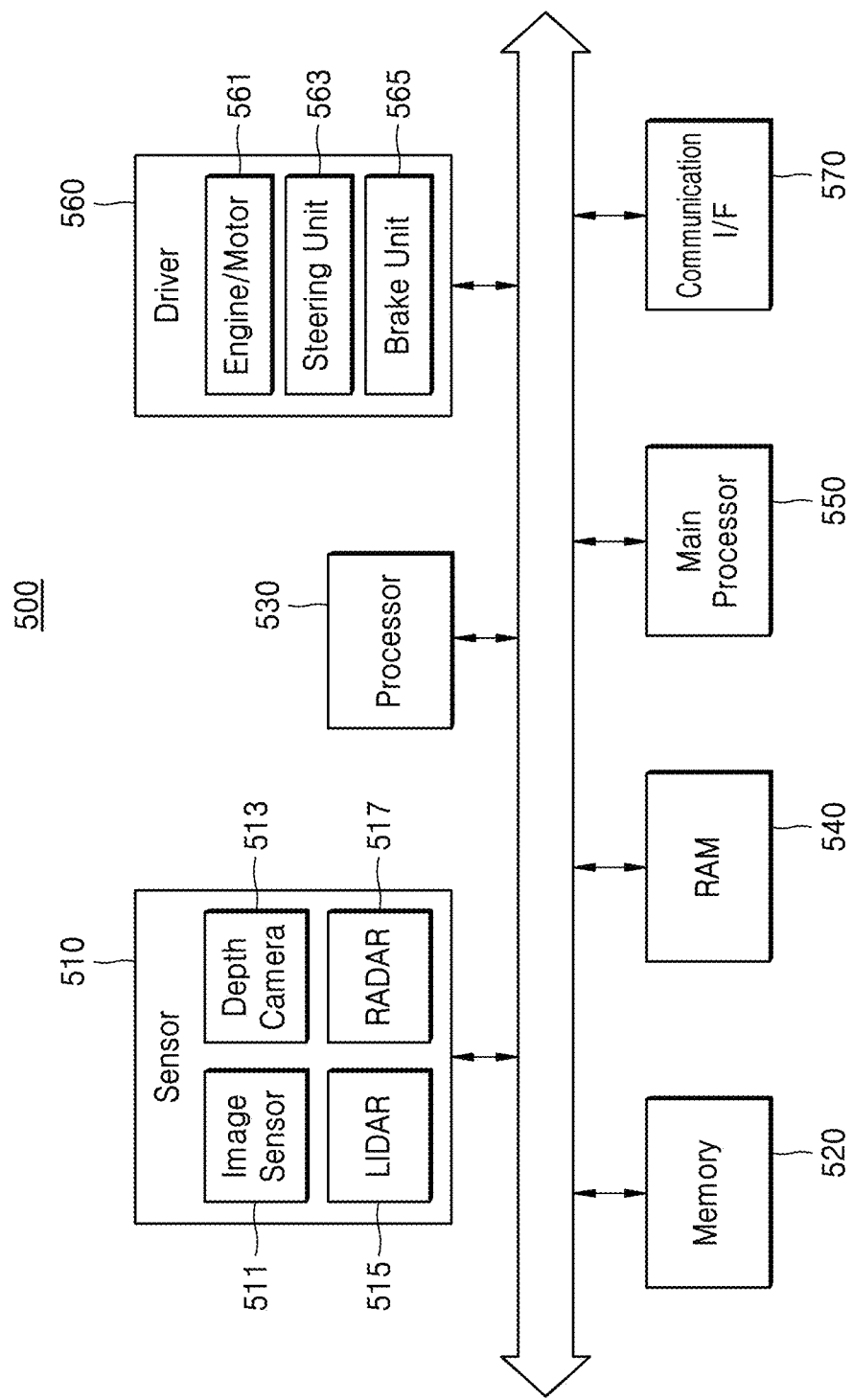
FIG. 20 is a block diagram illustrating an autonomous driving device according to some example embodiments of the present disclosure.

The method may further include generating and/or transmitting an output signal that includes information based on the determined vanishing point of the second image, for example to a vehicle controller 410 (e.g., vehicle control circuitry), where the information based on the determined vanishing point of the second image may be used by the vehicle controller 410 to determine a variation of the surrounding environment and/or a position of the host vehicle 400 as the vehicle moves (e.g., drives) through the surrounding environment. The vehicle controller 410 may control one or more elements of the host vehicle 400 (e.g., some or all of the driver 560 as shown in FIG. 20) to control driving and/or navigation of the host vehicle 400 through the surrounding environment based on the determined vanishing point of the second image. Accordingly, the method shown in FIG. 19 may be used determine a particular course to be followed by the host vehicle 400 through a surrounding environment and/or to implement at least partially autonomous driving of the host vehicle 400 along a particular course through the surrounding environment (e.g., on a road) even if boundary markings of the course to be followed by the host vehicle 400 through the surrounding environment (e.g., lane markings on the road) are absent. Accordingly, the autonomous driving of the host vehicle 400 through the surrounding environment may be enabled and/or improved.

FIG. 20 is a block diagram illustrating an autonomous driving device according to some example embodiments of the present disclosure.

Referring to FIG. 20, an autonomous driving device 500, which may correspond to the host vehicle 400 of FIG. 3, may include a sensor 510, a memory 520, a processor 530, RAM 540, a main processor 550, a driver 560, and a communication interface 570, and components of the autonomous driving device 500 may be connected and communicate with each other through a bus. At this time, an image sensor 511 included in the sensor 510 may correspond to the image sensor 100 of the above-described embodiments, and the memory 520 may correspond to the memory 200 of the above-described embodiments, and the processor 530 may correspond to the processor 300 of the above-described embodiments and may be referred to herein as a first processing circuitry. Also, the main processor 550 may correspond to the vehicle controller 410 of FIG. 3. In some embodiments, the image sensor 511, the memory 520, and the processor 530 may be implemented using the example embodiments described above with reference to FIGS. 1 to 19.

The autonomous driving device 500 may perform real-time analysis of the surrounding environment data of the autonomous vehicle, based on a neural network, and perform situation determination and vehicle operation control.

A neural network may include various neural network systems and/or machine learning systems, e.g., an artificial neural network (ANN) system, a convolutional neural network (CNN) system, a deep neural network (DNN) system, a deep learning system, or the like. Such machine learning systems may include a variety of learning models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively or additionally, such machine learning systems may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. Such machine learning models may also be used to provide for example, at least one of various services and/or applications, e.g., an image classify service, a user authentication service based on bio-information or biometric data, an advanced driver assistance system (ADAS) service, a voice assistant service, an automatic speech recognition (ASR) service, or the like, and may be performed, executed, implemented, processed, or the like by some or all of any of the systems and/or devices described herein, including some or all of the autonomous driving device 500 (e.g., processor 530 and/or main processor 550).

Such models may be implemented with software or hardware and be a model based on at least one of an artificial neural network (ANN) model, a multi-layer perceptrons (MLPs) model, a convolutional neural network (CNN) model, a deconvolutional neural network, a decision tree model, a random forest model, an Adaboost (adaptive boosting) model, a multiple regression analysis model, a logistic regression model, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively or additionally, such models may include other forms of artificial intelligence models, such as, for example, linear and/or logistic regression, statistical clustering, Bayesian classification, decision trees, dimensionality reduction such as principal component analysis, and expert systems a random sample consensus (RANSAC) model; and/or combinations thereof. Examples of such models are not limited thereto.

The sensor 510 may include a plurality of sensors that receive an image signal related to the surrounding environment of the autonomous driving device 500 and output the received image signal as an image. For example, the sensor 510 includes the image sensor 511 such as a charge coupled device (CCD) and a complementary metal oxide semiconductor (CMOS), a depth camera 513, a light detection and ranging (LiDAR) sensor 515, a Radio Detecting And Ranging (Radar) sensor 517, and the like. Moreover, the present disclosure is not limited to this and may include an ultrasonic sensor (not shown), an infrared sensor (not shown), and the like. In some example embodiments, the image sensor 511 may generate a front image of the autonomous driving device 500 and provide the generated front image to the processor 530.

The memory 520 is a storage location for storing data, and for example, may store various data generated in the process of performing operations of the main processor 550 and the processor 530.

When an image is received from the image sensor 511, based on information on the image in the previous sequence of the received image, the vanishing point of the image in the previous sequence, and the object in the image in the previous sequence, the processor 530 may extract the vanishing point of the received image. The method of the processor 530 to extract the vanishing point may be substantially the same as the method described above with reference to FIGS. 1 to 19, and a duplicate description is omitted.

The main processor 550 may control the overall operation of the autonomous driving device 500. For example, the main processor 550 may control functions of the processor 530 by executing programs stored in the RAM 540. The RAM 540 may temporarily store programs, data, applications, or instructions.

In addition, the main processor 550 may control the operation of the autonomous driving device 500 based on the operation result of the processor 530. As some example embodiments, the main processor 550 may receive information on the vanishing point from the processor 530 and control the operation of the driver 560 based on the received vanishing point information. Such control may include generating output signals, based on an obtained vanishing point of a current image of at least a portion of a surrounding environment, based on a previous image of the surrounding environment, for example as described herein with regard to FIGS. 1-19, that cause the driver 560 to drive and/or navigate the autonomous driving device 500, which may be a vehicle, through the surrounding environment.

The driver 560 (e.g., vehicle driving control device) is configured to drive the autonomous driving device 500, and may include an engine and a motor 561, a steering unit 563 (e.g., steering device), and a brake unit 565 (e.g., a vehicle brake). In some example embodiments, the driver 560 may adjust the propulsion, braking, speed, direction, and the like of the autonomous driving device 500 using the engine and motor 561, the steering unit 563, and the brake unit 565 under the control of the processor 530. In some example embodiments, the main processor 550, also referred to herein as a second processing circuitry, may control the drive and thus may be configured to control an operation of a host vehicle that includes the autonomous driving device 500 based on information associated with the vanishing point of the second image obtained through the processor 530 (e.g., first processing circuitry).

The communication interface 570 may communicate with an external device using a wired or wireless communication method. For example, the communication interface 570 may perform communication using a wired communication method such as Ethernet, or may perform communication using a wireless communication method such as Wi-Fi or Bluetooth.

While the inventive concepts have been particularly shown and described with reference to some example embodiments thereof, it will be understood that various changes in form and details may be made therein without departing from the spirit and scope of the following claims.

What is claimed is:

1. A method for performing vanishing point extraction, the method comprising:
  obtaining a straight line including a vanishing point of a first image for a surrounding environment of a host vehicle, based on processing the first image;
  obtaining a plurality of sample points in the first image based on processing the first image according to an object included in the first image and the straight line including the vanishing point of the first image, such that the plurality of sample points are determined as pixels in the first image having coordinates that overlap with coordinates of pixels of both the straight line and the object included in the first image;
  obtaining at least one matching point, in a second image for the surrounding environment of the host vehicle, that corresponds to at least one sample point of the plurality of sample points in the first image, the second image generated subsequently to the first image being generated;
  obtaining a vanishing point of the second image based on the at least one matching point of the second image; and
  providing the vanishing point of the second image to a vehicle controller which controls autonomous driving of the host vehicle.

2. The method of claim 1, wherein the obtaining of the at least one matching point comprises:
  obtaining a plurality of first templates each corresponding to a separate sample point of the plurality of sample points of the first image;
  obtaining at least one second template in the second image, where the at least one second template is determined to be similar to at least one first template of the plurality of first templates; and
  obtaining the at least one matching point as a pixel in the second image that is associated with the at least one second template.

3. The method of claim 2, wherein the obtaining of the plurality of first templates comprises obtaining areas of a particular size as the plurality of first templates, wherein the areas include separate, respective sample points of the plurality of sample points.

4. The method of claim 2, wherein the obtaining of the at least one second template comprises:
  obtaining a plurality of search areas of the second image, the plurality of search areas corresponding to separate, respective sample points of the plurality of sample points of the first image; and
  obtaining, for each sample point, a candidate area, in a search area corresponding to the sample point, that is similar to a first template corresponding to the sample point as a separate second template of the at least one second template.

5. The method of claim 4, wherein the obtaining of the plurality of search areas comprises:
  identifying points in the second image that have same coordinates in the second image as coordinates of separate, respective points of the plurality of sample points in the first image; and obtaining areas in the second image that have a particular size and include separate, respective points of the identified points as the plurality of search areas.

6. The method of claim 4, wherein the plurality of search areas have sizes that are larger than sizes of the plurality of first templates.

7. The method of claim 4, wherein the obtaining of the candidate area that is similar to the first template corresponding to the sample point as the separate second template comprises:
   determining a plurality of candidate areas in the search area corresponding to the sample point;
   calculating a correlation value between each candidate area of the plurality of candidate areas and the first template that corresponds to the sample point to establish a plurality of correlation values that correspond to separate, respective candidate areas; and
   obtaining a candidate area corresponding to a highest correlation value of the plurality of correlation values as the separate second template.

8. The method of claim 2, wherein the obtaining of the at least one matching point from the at least one second template comprises identifying a center point of the at least one second template as the at least one matching point.

9. The method of claim 1, wherein the straight line including the vanishing point of the first image is a horizontal line parallel to a horizontal axis of the first image.

10. The method of claim 1, further comprising:
    removing an outlier of the at least one matching point,
    wherein the obtaining of the vanishing point of the second image is based on at least one matching point from which the outlier is removed.

11. The method of claim 1, wherein the obtaining of the vanishing point of the second image comprises correcting the vanishing point of the first image based on the at least one matching point to obtain the vanishing point of the second image.

12. The method of claim 11, wherein the obtaining of the vanishing point of the second image is based on correcting a y-coordinate of the vanishing point of the first image using y-coordinates of the at least one matching point.

13. A vanishing point extraction device, comprising:
    an image sensor, the image sensor configured to generate a first image and to generate a second image subsequently to generating the first image, wherein the first image and the second image are images of a surrounding environment of a host vehicle;
    a memory configured to store the first image, information associated with a vanishing point of the first image, and information associated with at least one object included in the first image; and
    processing circuitry configured to, in response to receiving the second image from the image sensor,
       identify a horizontal line in the first image that includes the vanishing point of the first image based on the information associated with the vanishing point of the first image,
       obtain a plurality of sample points in the first image based on processing the first image using the information associated with the at least one object included in the first image, such that the plurality of sample points are determined as pixels in the first image having coordinates that overlap with coordinates of pixels of both the at least one object and the horizontal line,
       identify at least one matching point in the second image that corresponds to at least one sample point of the plurality of sample points in the first image,
       obtain a vanishing point of the second image based on correcting the vanishing point of the first image using the at least one matching point, and
       providing the vanishing point of the second image to a vehicle controller which controls autonomous driving of the host vehicle.

14. The vanishing point extraction device of claim 13, wherein the processing circuitry is further configured to
    obtain a plurality of first templates in the first image, the plurality of first templates corresponding to separate, respective sample points of the plurality of sample points in the first image, and
    obtain at least one second template in the second image, the at least one second template being similar to at least one first template of the plurality of first templates.

15. The vanishing point extraction device of claim 14, wherein the processing circuitry is further configured to obtain areas of a particular size as the plurality of first templates, wherein each separate area includes a separate sample point of the plurality of sample points.

16. The vanishing point extraction device of claim 14, wherein the processing circuitry is further configured to
    obtain a plurality of search areas of the second image, the plurality of search areas corresponding to separate, respective sample points of the plurality of sample points of the first image, and
    obtain, for each sample point, a candidate area, in a search area corresponding to the sample point, that is similar to a first template corresponding to the sample point as a separate second template of the at least one second template.

17. The vanishing point extraction device of claim 16, wherein the processing circuitry is further configured to
    identify points in the second image that have same coordinates in the second image as coordinates of separate, respective points of the plurality of sample points in the first image, and
    obtain areas in the second image that have a particular size and include separate, respective points of the identified points as the plurality of search areas.

18. The vanishing point extraction device of claim 16, wherein the processing circuitry is configured to
    determine a plurality of candidate areas in the search area corresponding to the sample point,
    calculate a correlation value between each candidate area of the plurality of candidate areas and the first template that corresponds to the sample point to establish a plurality of correlation values that correspond to separate, respective candidate areas, and
    obtain a candidate area corresponding to a highest correlation value of the plurality of correlation values as the separate second template.

19. The vanishing point extraction device of claim 14, wherein the processing circuitry is further configured to identify a central point of the at least one second template as the at least one matching point.

20. An autonomous driving device configured to be included in a host vehicle, the autonomous driving device comprising:
    an image sensor, the image sensor configured to generate a first image and to generate a second image subsequently to generating the first image;

a memory configured to store the first image, information associated with a vanishing point of the first image, and information associated with at least one object included in the first image;

a first processing circuitry configured to, in response to receiving the second image from the image sensor,
- identify a horizontal line in the first image that includes the vanishing point of the first image based on the information associated with the vanishing point of the first image,
- obtain a plurality of sample points in the first image based on processing the first image using the information associated with the at least one object included in the first image, such that the plurality of sample points are determined as pixels in the first image having coordinates that overlap with coordinates of pixels of both the at least one object and the horizontal line,
- identify at least one matching point in the second image that corresponds to at least one sample point of the plurality of sample points in the first image, and
- obtain a vanishing point of the second image based on correcting the vanishing point of the first image using the at least one matching point; and a second processing circuitry configured to control an operation of the host vehicle based on the information associated with the vanishing point of the second image obtained through the first processing circuitry.

* * * * *